(12) United States Patent
Dhayalkar

(10) Patent No.: US 12,570,003 B2
(45) Date of Patent: Mar. 10, 2026

(54) SYSTEMS, AND METHODS FOR REAL TIME CALIBRATION OF MULTIPLE RANGE SENSORS ON A ROBOT

(71) Applicant: Brain Corporation, San Diego, CA (US)

(72) Inventor: Sahil Dhayalkar, San Diego, CA (US)

(73) Assignee: Brain Corporation, San Diego, CA (US)

( * ) Notice: Subject to any disclaimer, the term of this patent is extended or adjusted under 35 U.S.C. 154(b) by 636 days.

(21) Appl. No.: 17/898,817

(22) Filed: Aug. 30, 2022

(65) Prior Publication Data

US 2023/0071953 A1     Mar. 9, 2023

Related U.S. Application Data

(60) Provisional application No. 63/238,924, filed on Aug. 31, 2021.

(51) Int. Cl.
| | |
|---|---|
| *B25J 9/16* | (2006.01) |
| *G01S 7/497* | (2006.01) |
| *G01S 17/894* | (2020.01) |

(52) U.S. Cl.
CPC ............. *B25J 9/1692* (2013.01); *G01S 7/497* (2013.01); *G01S 17/894* (2020.01)

(58) Field of Classification Search
CPC ...... B25J 9/1692; G01S 7/497; G01S 17/894; G01S 7/4972; G01S 17/87; G01S 17/89; G05B 2219/39058
See application file for complete search history.

(56) References Cited

U.S. PATENT DOCUMENTS

| | | | | |
|---|---|---|---|---|
| 11,199,614 B1 * | 12/2021 | Gan | .......................... | G01S 17/42 |
| 11,959,774 B1 * | 4/2024 | Zhao | ........................... | G06T 7/80 |
| 2013/0242285 A1 * | 9/2013 | Zeng | ...................... | G01S 17/875 |
| | | | | 356/28 |
| 2017/0046840 A1 * | 2/2017 | Chen | ....................... | G01C 21/36 |
| 2018/0313942 A1 * | 11/2018 | Wu | ........................... | G01S 17/42 |

(Continued)

FOREIGN PATENT DOCUMENTS

| | | | | | |
|---|---|---|---|---|---|
| JP | 2020514876 A | * | 5/2020 | ............... | G06T 7/33 |

OTHER PUBLICATIONS

Ravindranath, P. "3D-3D Self-Calibration of Sensors Using Point Cloud Data", Apr. 2021, found online, URL:<https://saemobilus.sae.org/articles/3d-3d-self-calibration-sensors-using-point-cloud-data-2021-01-0086> (Year: 2021).*

(Continued)

*Primary Examiner* — Kamini S Shah
*Assistant Examiner* — Jonathan Michael Skrzycki
(74) *Attorney, Agent, or Firm* — Pierson Ferdinand LLP; Sidharth Kapoor

(57) ABSTRACT

Systems and methods for systems and methods for real time calibration of multiple range sensors on a robot are disclosed herein. According to at least one non-limiting exemplary embodiment, methods for self-calibration are used to independently correct rotational errors in a pose of a sensor. In some instances, the self-calibration may further yield errors along at least one translational axis. According to at least one non-limiting exemplary embodiment, methods for cross-calibration are used to correct translational errors and to ensure all sensors on a robot agree on perceived locations of objects.

17 Claims, 14 Drawing Sheets

(56) References Cited

U.S. PATENT DOCUMENTS

| | | | | |
|---|---|---|---|---|
| 2019/0219700 | A1* | 7/2019 | Coombe | G01S 17/86 |
| 2019/0392228 | A1* | 12/2019 | Zhu | G01S 17/931 |
| 2020/0043186 | A1* | 2/2020 | Selviah | G06T 7/33 |
| 2023/0304801 | A1* | 9/2023 | Russell | G01C 21/165 |
| 2024/0142587 | A1* | 5/2024 | Alismail | G01S 7/4972 |
| 2024/0144694 | A1* | 5/2024 | Alismail | G01S 7/497 |

OTHER PUBLICATIONS

セルビア , デイビッド アール English translation of JP-2020514876-A, 2020 (Year: 2020).*

Wikipedia, LIdar, 2025, URL:<https://en.wikipedia.org/wiki/Lidar> (Year: 2025).*

Liu, B. "A Rapid Coordinate Transformation Method Applied in Industrial Robot Calibration Based on Characteristic Line Coincidence" 2016, retrieved online URL: https://www.mdpi.com/1424-8220/16/2/239 (Year: 2016).*

* cited by examiner

FIG. 2A(iii)

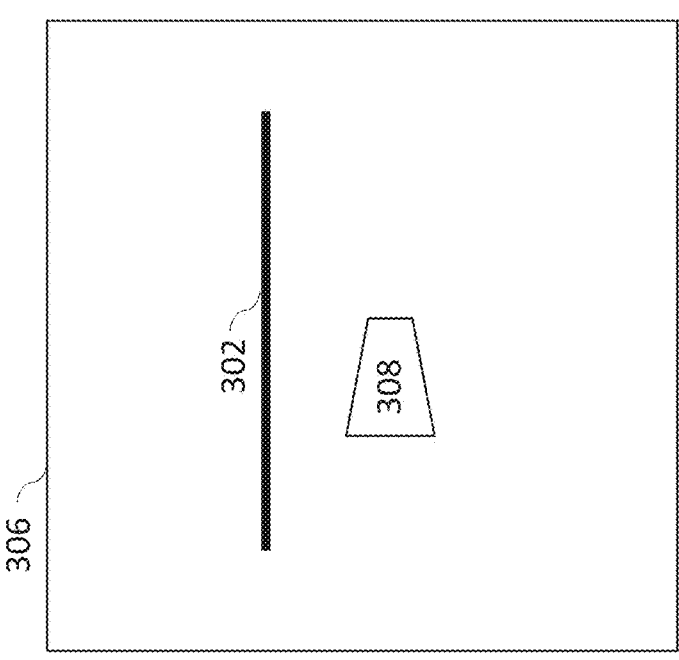
FIG. 3A(ii)
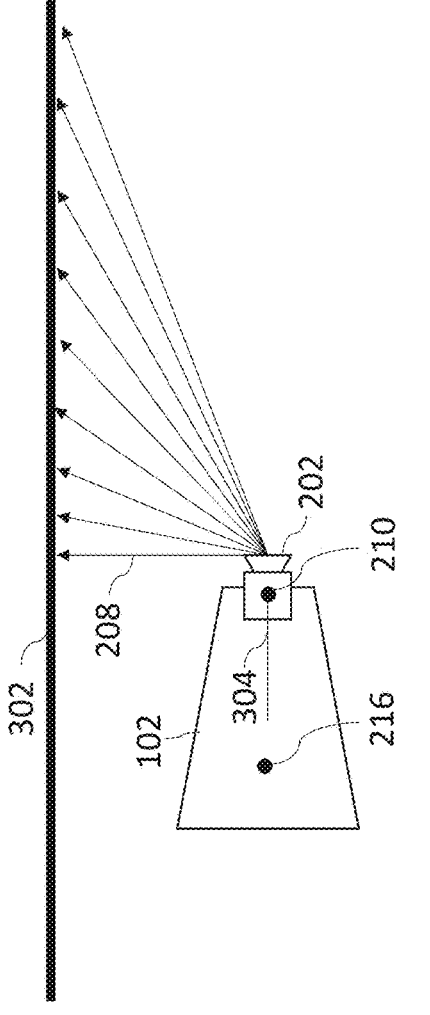
FIG. 3A(i)

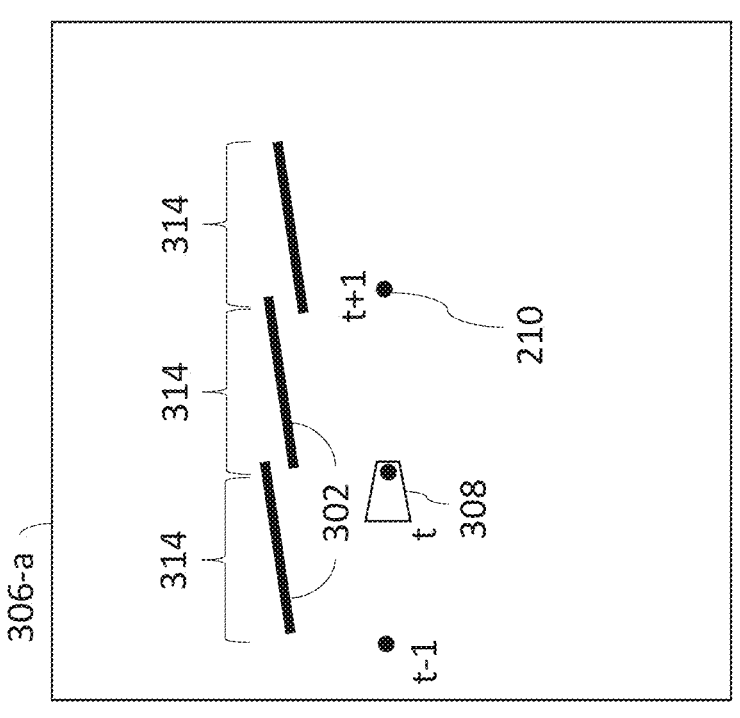
FIG. 3B(ii)
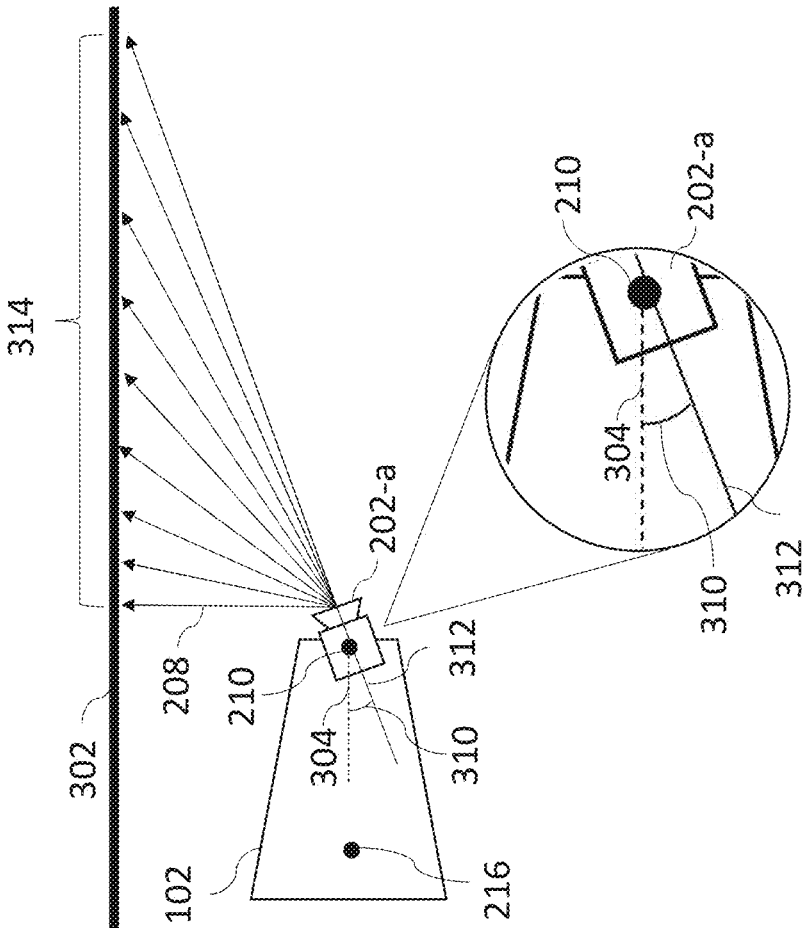
FIG. 3B(i)

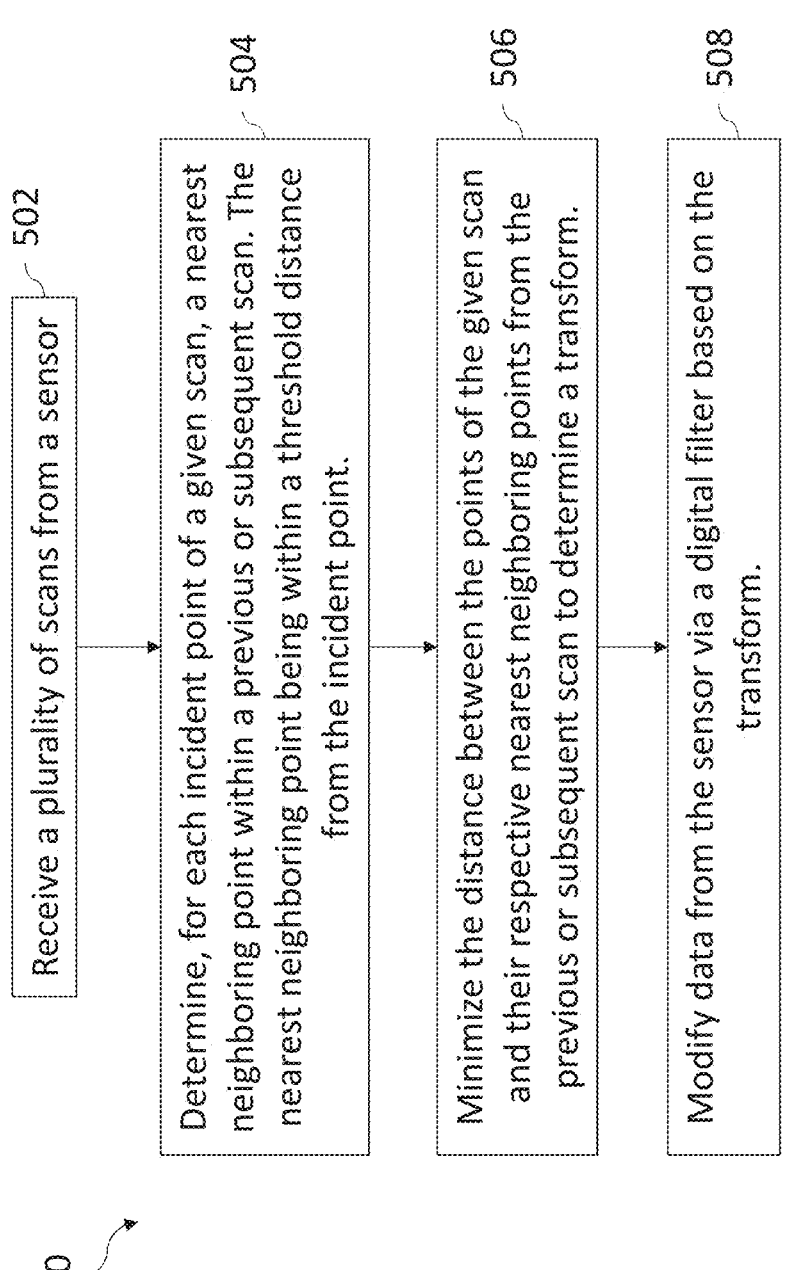

502

Receive a plurality of scans from a sensor

504

Determine, for each incident point of a given scan, a nearest neighboring point within a previous or subsequent scan. The nearest neighboring point being within a threshold distance from the incident point.

506

Minimize the distance between the points of the given scan and their respective nearest neighboring points from the previous or subsequent scan to determine a transform.

508

Modify data from the sensor via a digital filter based on the transform.

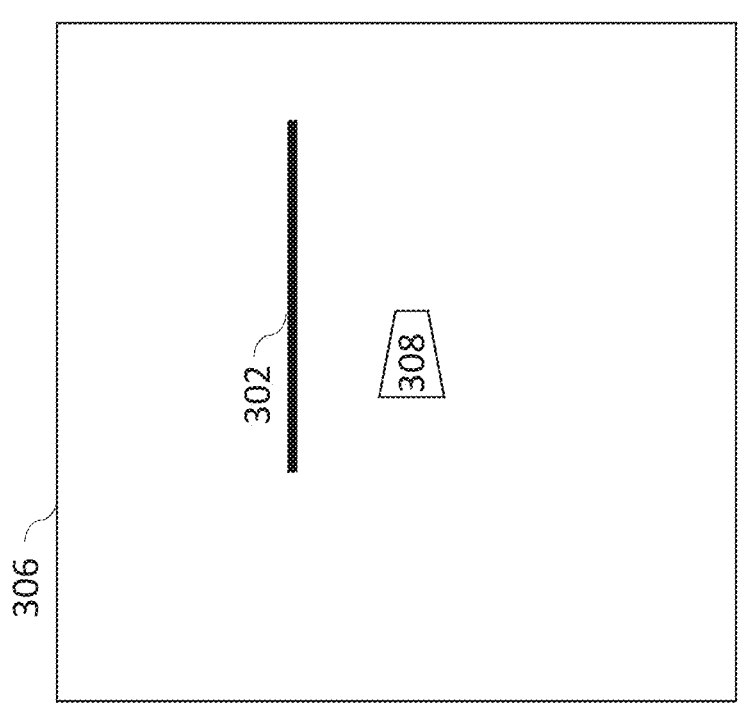
FIG. 7A(ii)
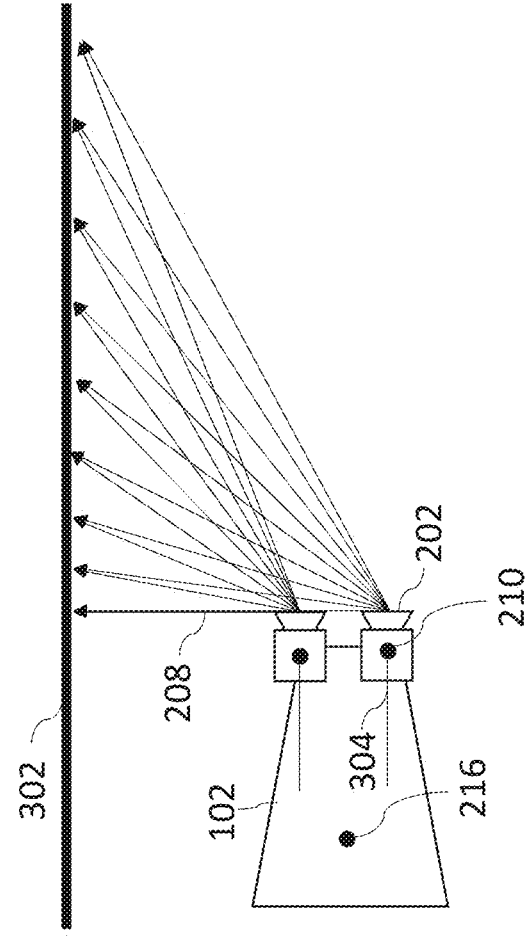
FIG. 7A(i)

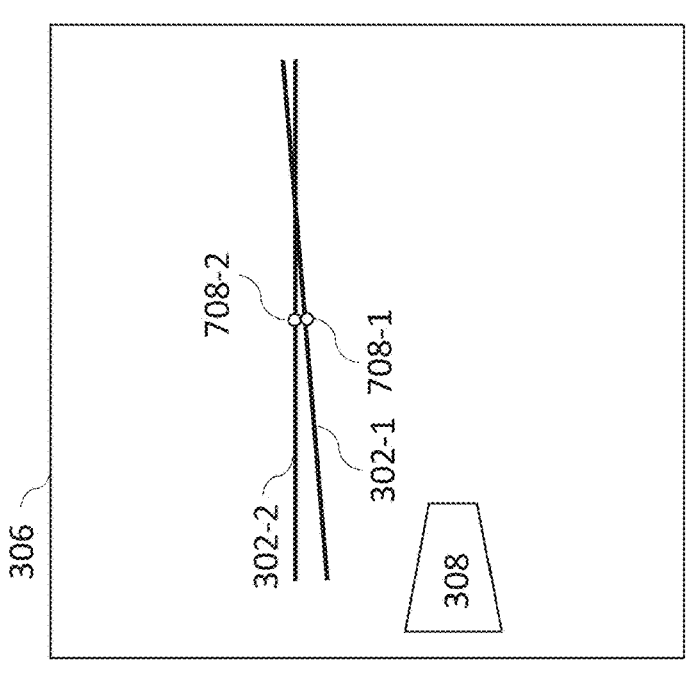
FIG. 7B(ii)
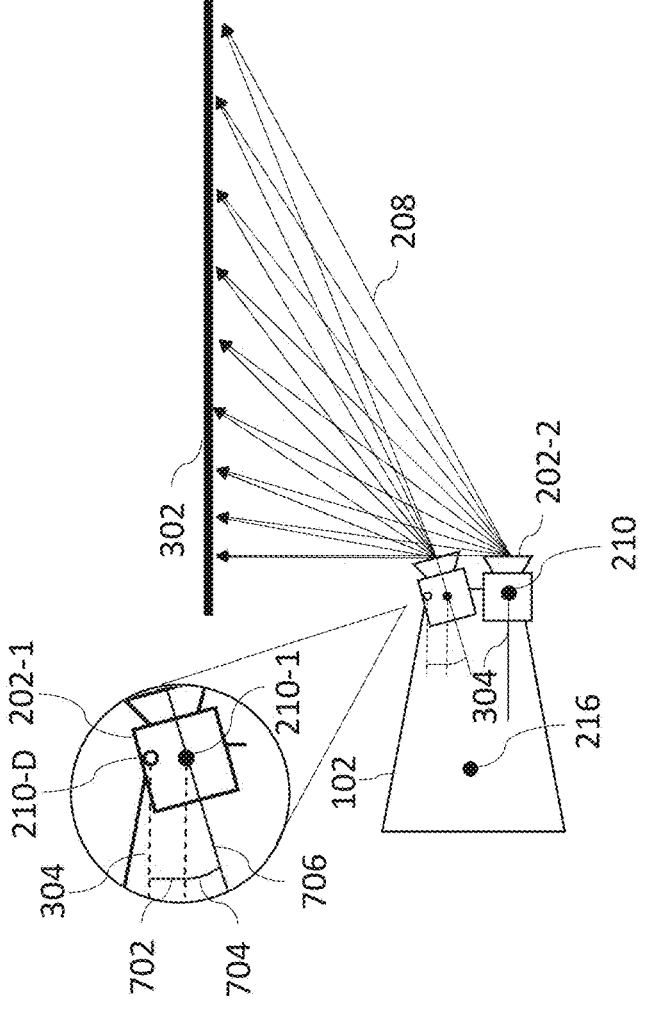
FIG. 7B(i)

FIG. 7C(ii)

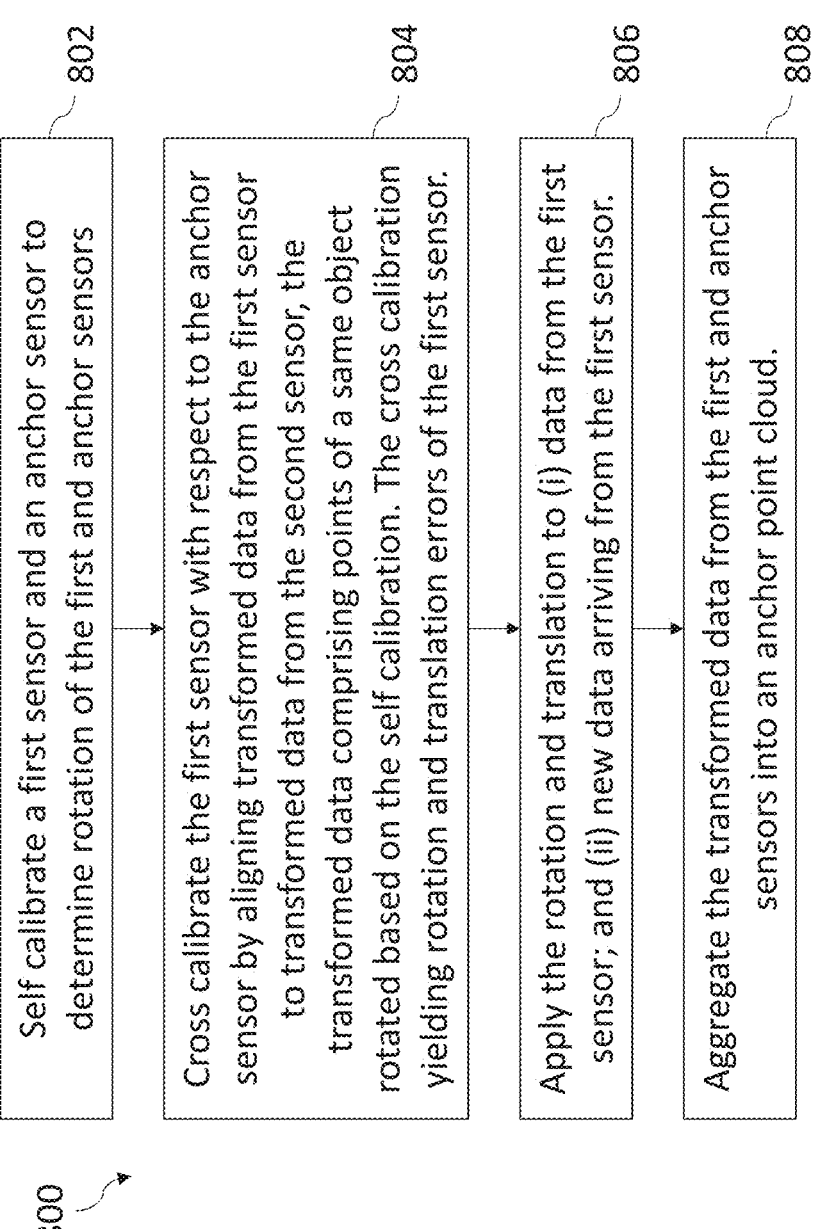

800

802 — Self calibrate a first sensor and an anchor sensor to determine rotation of the first and anchor sensors 804 — Cross calibrate the first sensor with respect to the anchor sensor by aligning transformed data from the first sensor to transformed data from the second sensor, the transformed data comprising points of a same object rotated based on the self calibration. The cross calibration yielding rotation and translation errors of the first sensor.

806 — Apply the rotation and translation to (i) data from the first sensor; and (ii) new data arriving from the first sensor.

808 — Aggregate the transformed data from the first and anchor sensors into an anchor point cloud.

FIG. 8

SYSTEMS, AND METHODS FOR REAL TIME CALIBRATION OF MULTIPLE RANGE SENSORS ON A ROBOT

PRIORITY

This application claims the benefit of U.S. provisional patent application No. 63/238,924, filed Aug. 31, 2021, under 35 U.S.C. §§ 119, the entire disclosure of which is incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for real time calibration of multiple range sensors on a robot.

SUMMARY

The foregoing needs are satisfied by the present disclosure, which provides for, inter alia, systems and methods for real time calibration of multiple range sensors on a robot.

Exemplary embodiments described herein have innovative features, no single one of which is indispensable or solely responsible for their desirable attributes. Without limiting the scope of the claims, some of the advantageous features will now be summarized. One skilled in the art would appreciate that as used herein, the term robot may generally be referred to autonomous vehicle or object that travels a route, executes a task, or otherwise moves automatically upon executing or processing computer readable instructions.

According to at least one non-limiting exemplary embodiment, a method is disclosed. The method, comprises a controller of a robot: receiving a point cloud from a first sensor, wherein the point cloud comprises an aggregate of a plurality of a sequence of scans captured from the first sensor, the scans each comprise a plurality of points; aligning points of each scan to their respective nearest neighboring points of subsequent or prior scans in the sequence of scans, wherein the alignment corresponds to a rotational transform, the alignment comprising a self-calibration; and applying the rotational transform to (i) data from the first sensor, and (ii) the point cloud.

According to at least one non-limiting exemplary embodiment, the method further comprises the controller cross-calibrating the first sensor by aligning the point cloud from the first sensor to a second point cloud from a second sensor, the second point cloud comprising an aggregate of sequential scans from the second sensor, each scan comprising a plurality of points, wherein the aligning yields a second transform comprising at least one of a translation or rotation; and applying the second transform to (i) data from the first sensor, and (ii) the point cloud of the first sensor.

According to at least one non-limiting exemplary embodiment, the method further comprises the controller self-calibrating the second sensor prior to the cross-calibration by aligning points of each scan to a nearest neighboring point of a prior or subsequent scan of the second point cloud, wherein the alignment yields a third rotational transform; and applying the third rotational transform to (i) data from the second sensor, and (ii) the points of the second point cloud prior to the cross-calibration.

According to at least one non-limiting exemplary embodiment, the method further comprises the controller aggregating the first point cloud, with the rotational transform and second transform applied thereto, with the second point cloud, with the second rotational transform applied thereto, to yield a third point cloud; and utilizing the third point cloud to produce a computer readable map of the environment.

According to at least one non-limiting exemplary embodiment, the respective nearest neighboring points are within a threshold distance.

According to at least one non-limiting exemplary embodiment, the cross calibration causes the point cloud of the first sensor to align substantially with the second point cloud of the second sensor.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 3A(i-ii) illustrates a robot comprising a sensor mounted in its default position sensing an object and a computer readable map produced by the sensor, according to an exemplary embodiment.

FIG. 3B(i-ii) illustrates a robot comprising a sensor not in its default position sensing an object and a computer readable map produced by the sensor, according to an exemplary embodiment.

FIG. 5 is a process flow diagram illustrating a method for self-calibration of a range sensor, according to an exemplary embodiment.

FIG. 7A(i-ii) illustrate a robot comprising two range sensors in their default positions sensing an object and producing a computer readable map, according to an exemplary embodiment.

FIG. 7B(i-ii) illustrate a robot comprising two range sensors, one including an error in its pose, sensing an object and producing a computer readable map, according to an exemplary embodiment.

FIG. 8 is a process flow diagram illustrating a method for cross-calibrating two sensors on a robot, according to an exemplary embodiment.

Figure 1A:
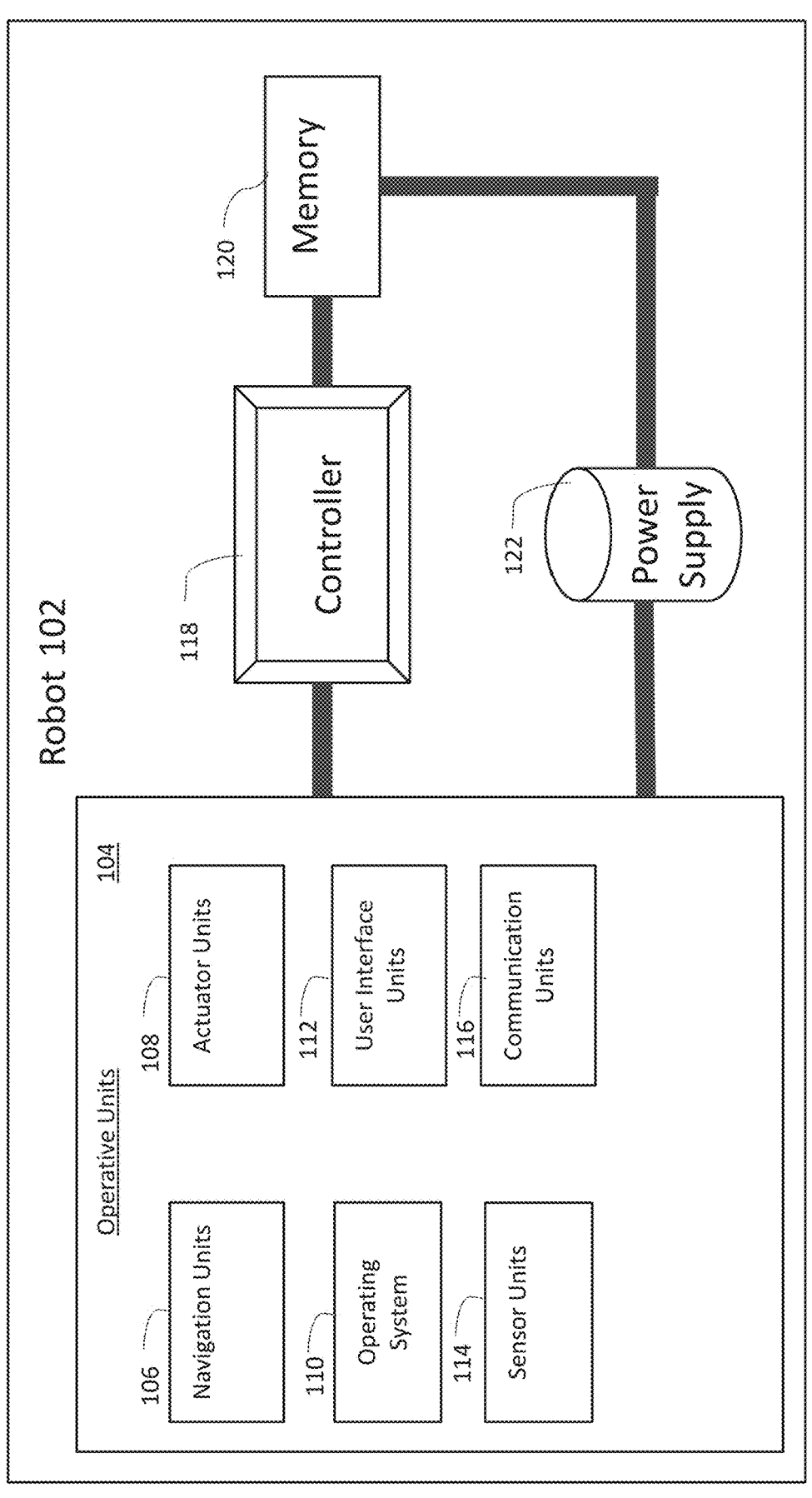
FIG. 1A is a functional block diagram of a robot in accordance with some embodiments of this disclosure.

All Figures disclosed herein are © Copyright 2022 Brain Corporation. All rights reserved.

DETAILED DESCRIPTION

Typically, sensors on robots are calibrated by manufacturers of the robots as an end of line procedure to verify the robots are safe to operate. These calibration methods often require external equipment, targets of known size at known locations, and other special environmental configurations. These yield accurate calibration results but are not easily executed once a robot is or has been operating (e.g., outside of a manufacturer's facility) as calibrating using reference objects of known size/shape/location may require a skilled technician to travel to the robot to calibrate the sensors. Accordingly, there is a need in the art for systems and methods for real-time calibration of range sensors of robots which do not require skilled technicians, specialized environments, or external reference objects.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for real-time calibration of multiple range sensors on a robot. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, mobile platforms, personal transportation devices (e.g., hover boards, SEGWAY® personal vehicles, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, a default position or pose of a sensor corresponds to an ideal or predetermined (x, y, z, yaw, pitch, roll) position of the sensor. Typically, the default positions are specified by manufacturers or designers of robots. These default positions are often configured to ensure the sensors of a robot cover all necessary areas (e.g., cover blind spots) needed to operate the robot safely. Default positions serve as an initial reference point when defining errors of a sensor pose, the errors corresponding to any deviation of the sensor from its default pose. "Pose" as used herein refers to the position (x, y, z, yaw, pitch, roll) of the camera, which may be different or the same as the default pose.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, 4G, or 5G including LTE/LTE-A/TD-LTE/TD-LTE, GSM, etc. variants thereof), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processor such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) enable robots to calibrate individual sensors coupled thereto; (ii) enable robots to calibrate multiple sensors coupled thereto; (iii) improve computer readable maps by ensuring objects are detected in a same location by all sensors of a robot; and (iv) improve navigation of robots by ensuring their sensors are well calibrated and their computer readable maps accurately represent their environments. Other advantages are readily discernable by one having ordinary skill in the art given the contents of the present disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processing devices (e.g., microprocessors) and other peripherals. As previously mentioned and used herein, processor, microprocessor, and/or digital processor may include any type of digital processor such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors and application-specific integrated circuits ("ASICs"). Peripherals may include hardware accelerators configured to perform a specific function using hardware elements such as, without limitation, encryption/description hardware, algebraic processors (e.g., tensor processing units, quadradic problem solvers, multipliers, etc.), data compressors, encoders, arithmetic logic units ("ALU"), and the like. Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 120 may provide computer-readable instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the computer-readable instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be internal to or on board robot 102 and/or may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units such as specifically configured task units (not shown) that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic (e.g., ASICS). In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; or repose cameras and sensors. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

Actuator unit 108 may also include any system used for actuating and, in some cases actuating task units to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("ToF") cameras, structured light cameras, etc.), antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, sensor units 114 may be in part external to the robot 102 and coupled to communications units 116. For example, a security camera within an environment of a robot 102 may provide a controller 118 of the robot 102 with a video feed via wired or wireless communication channel(s). In some instances, sensor units 114 may include sensors configured to detect a presence of an object at a location such as, for example without limitation, a pressure or motion sensor may be disposed at a shopping cart storage location of a grocery store, wherein the controller 118 of the robot 102 may utilize data from the pressure or motion sensor to determine if the robot 102 should retrieve more shopping carts for customers.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3.5G, 3.75G, 3GPP/3GPP2/HSPA+), 4G (4GPP/4GPP2/LTE/LTE-TDD/LTE-FDD), 5G (5GPP/5GPP2), or 5G LTE (long-term evolution, and variants thereof including LTE-A, LTE-U, LTE-A Pro, etc.), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used herein, a robot 102, a controller 118, or any other controller, processor, or robot performing a task, operation or transformation illustrated in the figures below comprises a controller executing computer readable instructions stored on a non-transitory computer readable storage apparatus, such as memory 120, as would be appreciated by one skilled in the art.

Figure 1B:
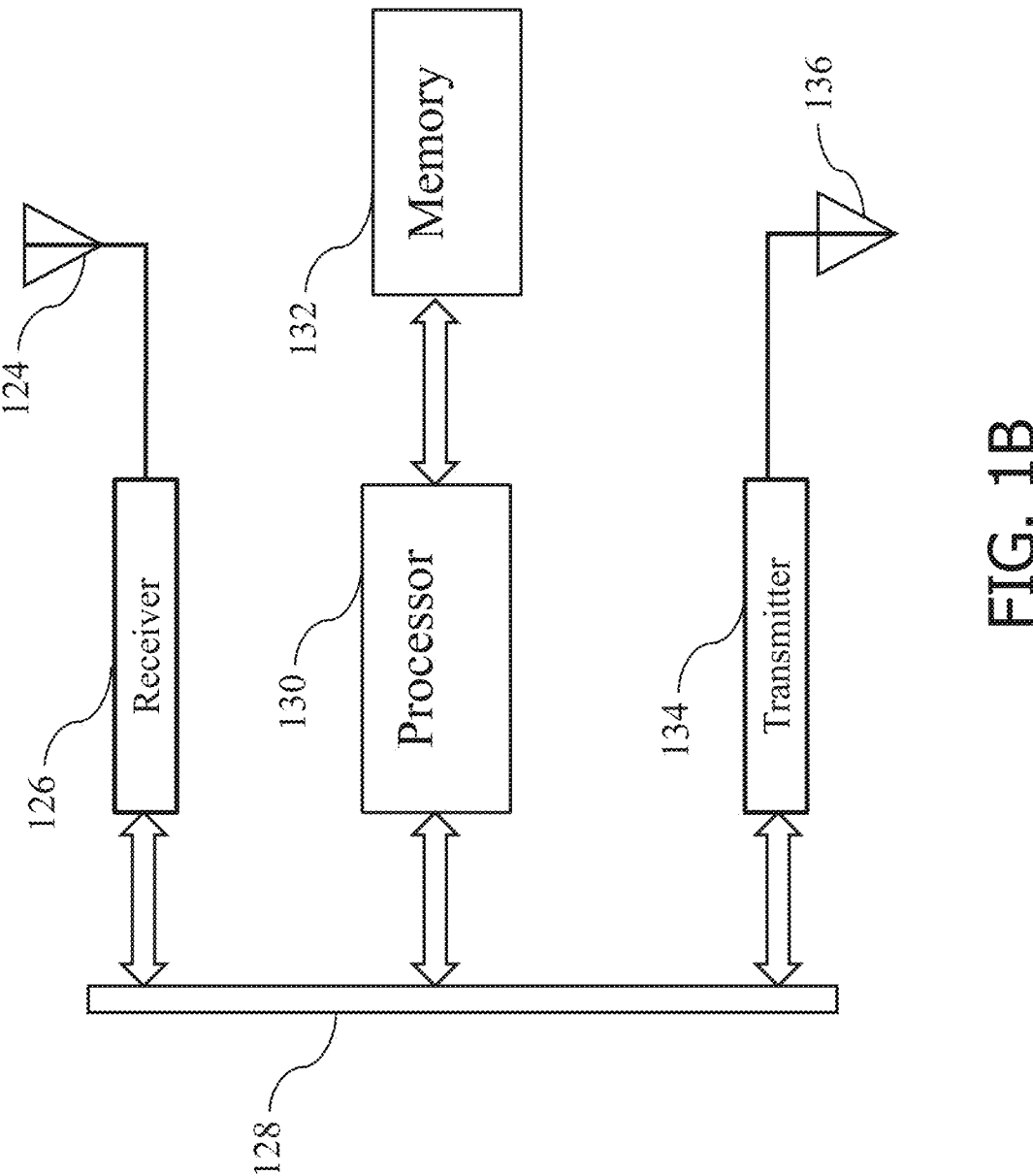
FIG. 1B is a functional block diagram of a controller or processor in accordance with some embodiments of this disclosure.

Next referring to FIG. 1B, the architecture of a processor or processing device 138 is illustrated according to an exemplary embodiment. As illustrated in FIG. 1B, the processing device 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132 which stores computer code or computer readable instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components—receiver, processor, and transmitter—in the processing device. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may also illustrate an external server architecture configurable to effectuate the control of a robotic apparatus from a remote location, such as a remote server. That is, the external server may also include a data bus, a receiver, a transmitter, a processor, and a memory that stores specialized computer readable instructions thereon.

One of ordinary skill in the art would appreciate that a controller 118 of a robot 102 may include one or more processing devices 130 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B using computer code. In some instances, peripheral devices are used as a means for intercommunication between the controller 118 and operative units 104 (e.g., digital to analog converters and/or amplifiers for producing actuator signals). Accordingly, as used herein, the controller 118 executing computer readable instructions to perform a function may include one or more processing devices 130 thereof executing computer readable instructions and, in some instances, the use of any hardware peripherals known within the art. Controller 118 may be illustrative of various processing devices 130 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processing devices 130 for performing high level tasks (e.g., planning a route to avoid obstacles) and processing devices 130 for performing low-level tasks (e.g., producing actuator signals in accordance with the route).

Figure 2A:
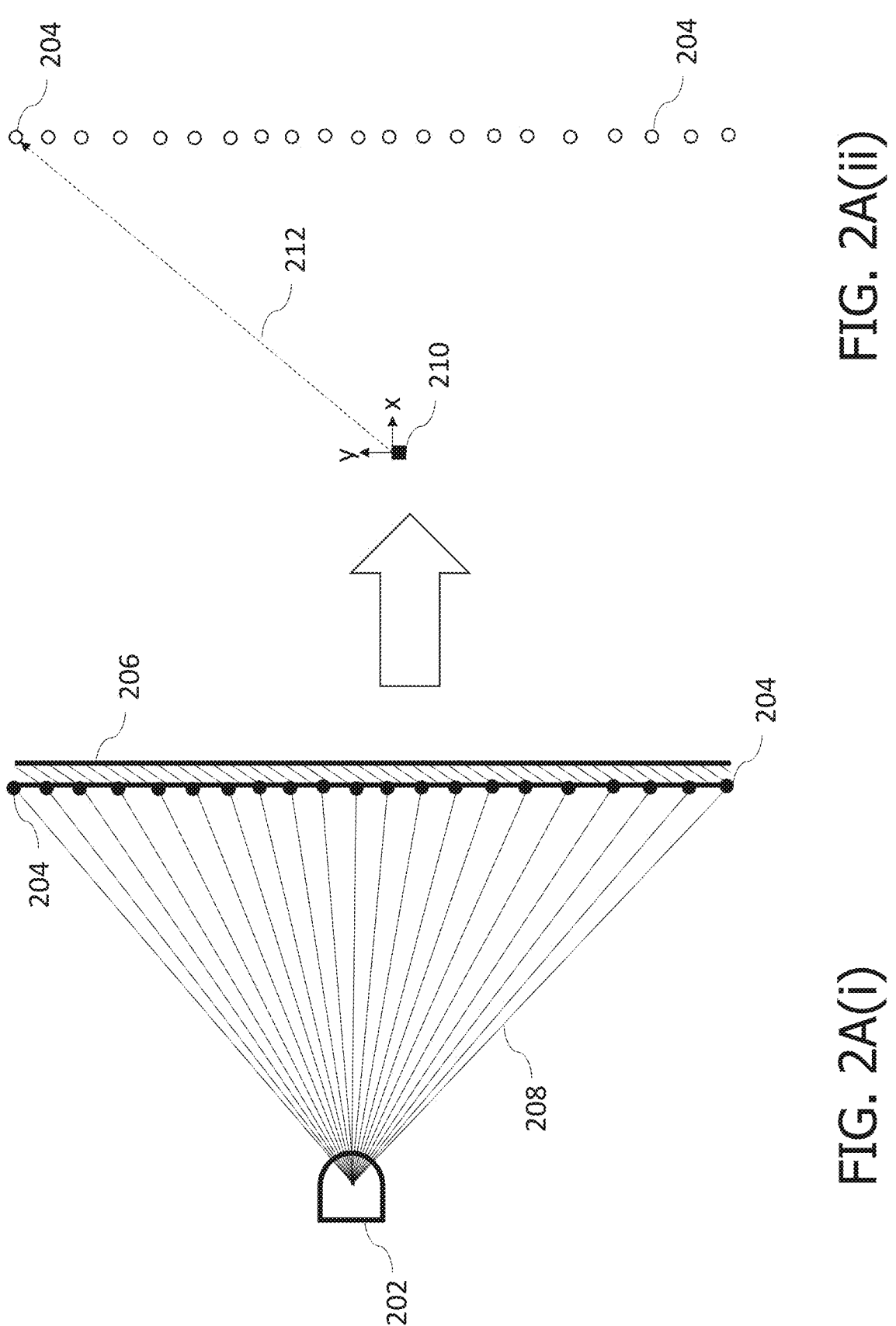
FIG. 2A(i-ii) illustrates a time of flight ("ToF") range sensor sensing an object and a point cloud generated therefrom, in accordance with some embodiments of this disclosure.

FIG. 2A(i-ii) illustrates a planar light detection and ranging ("LiDAR") sensor 202 coupled to a robot 102, which collects distance measurements to a wall 206 along a measurement plane in accordance with some exemplary embodiments of the present disclosure. Planar LiDAR sensor 202, illustrated in FIG. 2A(i), may be configured to collect distance measurements to the wall 206 by projecting a plurality of beams 208 of photons at discrete angles along a measurement plane and determining the distance to the wall 206 based on a time of flight ("ToF") of the photons leaving the LiDAR sensor 202, reflecting off the wall 206, and returning back to the LiDAR sensor 202. The measurement plane of the planar LiDAR 202 comprises a plane along which the beams 208 are emitted which, for this exemplary embodiment illustrated, is the plane of the page.

Individual beams 208 of photons may localize respective points 204 of the wall 206 in a point cloud, the point cloud comprising a plurality of points 204 localized in 2D or 3D space as illustrated in FIG. 2A(ii). The points 204 may be defined about a local origin 210 of the sensor 202. Distance 212 to a point 204 may comprise half the time of flight of a photon of a respective beam 208 used to measure the point 204 multiplied by the speed of light, wherein coordinate values (x, y) of each respective point 204 depends both on distance 212 and an angle at which the respective beam 208 was emitted from the sensor 202. The local origin 210 may comprise a predefined point of the sensor 202 to which all distance measurements are referenced (e.g., location of a detector within the sensor 202, focal point of a lens of sensor 202, etc.). For example, a 5-meter distance measurement to an object corresponds to 5 meters from the local origin 210 to the object.

According to at least one non-limiting exemplary embodiment, sensor 202 may be illustrative of a depth camera or other ToF sensor configurable to measure distance, wherein the sensor 202 being a planar LiDAR sensor is not intended to be limiting. Depth cameras may operate similar to planar LiDAR sensors (i.e., measure distance based on a ToF of beams 208); however, depth cameras may emit beams 208 using a single pulse or flash of electromagnetic energy, rather than sweeping a laser beam across a field of view. Depth cameras may additionally comprise a two-dimensional field of view rather than a one-dimensional, planar field of view.

According to at least one non-limiting exemplary embodiment, sensor 202 may be illustrative of a structured light LiDAR sensor configurable to sense distance and shape of an object by projecting a structured pattern onto the object and observing deformations of the pattern. For example, the size of the projected pattern may represent distance to the object and distortions in the pattern may provide information of the shape of the surface of the object. Structured light sensors may emit beams 208 along a plane as illustrated or in a predetermined pattern (e.g., a circle or series of separated parallel lines).

Figure 2B:
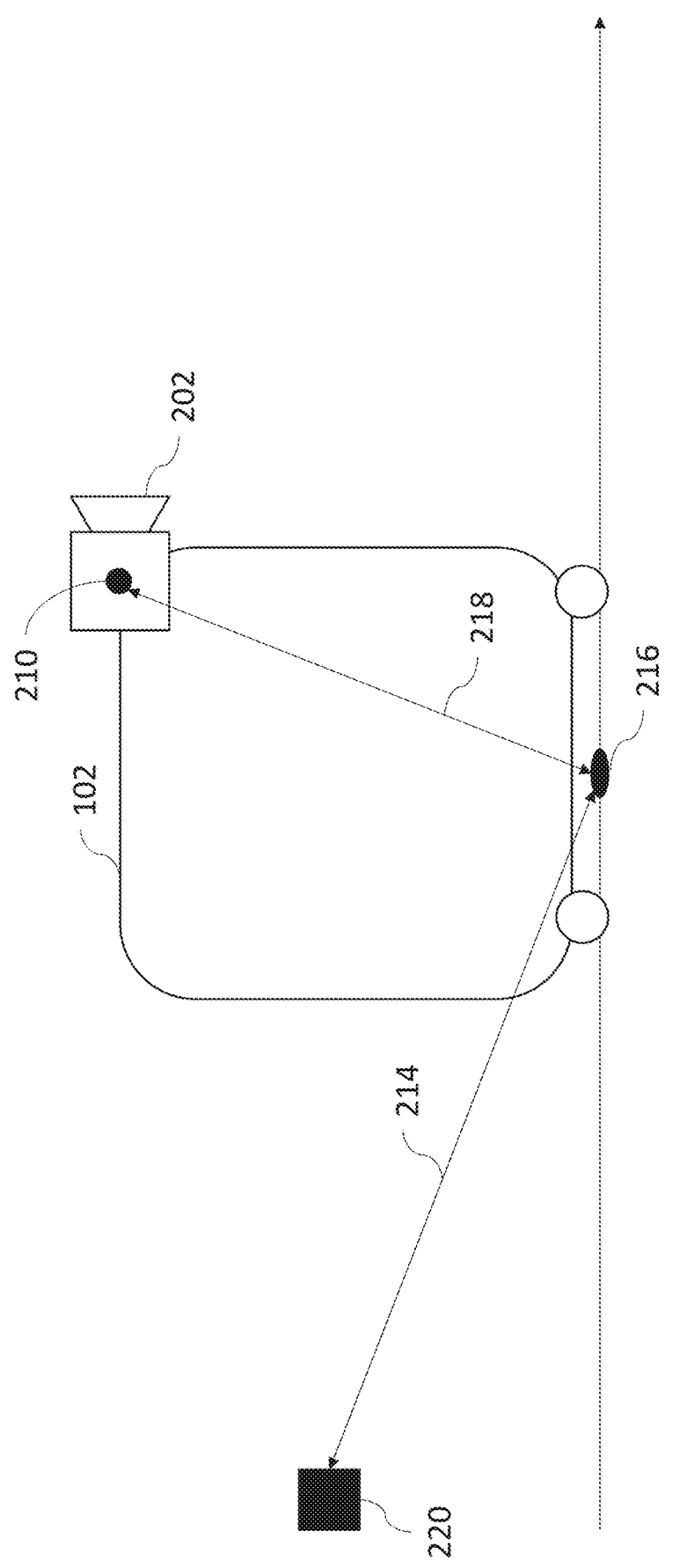
FIG. 2B illustrates various transforms used to define a location of a robot and location of a sensor, in accordance with some embodiments of this disclosure.

FIG. 2B illustrates a robot 102 comprising an origin 216 defined based on a transformation 214 from a world origin 220, according to an exemplary embodiment. World origin 220 may comprise a fixed or stationary point in an environment of the robot 102 which defines a (0,0,0) fixed reference location within the environment. Origin 216 of the robot 102 may denote a location of the robot 102, and transform 214 denotes the robot 102 location in the environment. For example, if the robot 102 is at a location (x=5 m, y=5 m, z=0 m), then origin 216 is at a location (5, 5, 0) meters with respect to the world origin 220. The origin 216 may be positioned anywhere inside or outside the robot 102 body such as, for example, between two wheels of the robot at z=0 (i.e., on the floor). The transform 214 may represent a matrix of values which configures a change in coordinates from being centered about the world origin 220 to the origin 216 of the robot 102. The value(s) of transform 214 may be based on a current position of the robot 102 and may change over time as the robot 102 moves, wherein the current position may be determined via navigation units 106 and/or using data from sensor units 114 of the robot 102.

The robot 102 may include one or more exteroceptive sensors 202 of sensor units 114, wherein each sensor 202 includes an origin 210. The positions of the sensor 202 may be fixed onto the robot 102 such that its origin 210 does not move with respect to the robot origin 216 as the robot 102 moves. Measurements from the sensor 202 may include, for example, distance measurements, wherein the distances measured correspond to a distance from the origin 210 of the sensor 202 to one or more objects. Transform 218 may define a coordinate shift from being centered about an origin 210 of the sensor 202 to the origin 216 of the robot 102, or vice versa. Transform 218 may be a fixed value, provided the sensor 202 does not change its position on the robot 102 body. In some embodiments, sensor 202 may be coupled to one or more actuator units 108 configured to change the position of the sensor 202 on the robot 102 body, wherein the transform 218 may further depend on the current pose of the sensor 202. Transform 218 may be utilized to convert, e.g., a 5 meter distance to an object measured by a range sensor 202 to a distance from the robot 102 with respect to robot origin 216 and/or position in the environment with respect to world origin 220.

Controller 118 of the robot 102 may always localize the robot origin 216 with respect to the world origin 220 during navigation, using transform 214 based on the robot 102 motions and position in the environment, and thereby localize sensor origin 210 with respect to the robot origin 216, using a fixed transform 218. In doing so, the controller 118 may convert locations of points 204 defined with respect to sensor origin 210 to locations defined about either the robot origin 216 or world origin 220. For example, transforms 214, 218 may enable the controller 118 of the robot 102 to translate a 5-m distance measured by the sensor 202 (defined as a 5-m distance between the point 204 and origin 210) into a location of the point 204 with respect to the robot origin 216 (e.g., distance of the point 204 to the robot 102) or world origin 220 (e.g., location of the point 204 in the environment).

It is appreciated that the position of the sensor 202 on the robot 102 is not intended to be limiting. Rather, sensor 202 may be positioned anywhere on the robot 102 and transform 218 may denote a coordinate transformation from being centered about the robot origin 216 to the sensor origin 210 wherever the sensor origin 210 may be. Further, robot 102 may include two or more sensors 202 in some embodiments, wherein there may be two or more respective transforms 218 which denote the locations of the origins 210 of the two or more sensors 202. Similarly, the relative position of the robot 102 and world origin 220 as illustrated is not intended to be limiting. As used herein, a "scan" refers to a singular discrete measurement taken by a sensor. A scan may include, but is not limited to, an image, a depth image, a frame of a video, a collection of range measurements from a single sweep of a scanning LiDAR sensor (e.g., rays 208 encoded with a specific modulation frequency as to be discernable from other future or former emitted rays 208 from the same sensor), a single beam or range from a LiDAR sweep, a single sample of a structured light projected pattern, a single range measurement from an ultrasonic sensor, and/or any other discretized measurement. Scans from the sensor units 114 of the robot 102 may be timestamped such that the controller 118 is able to determine when each measurement was taken. Since the controller 118 continuously localizes the robot 102 in the environment, these timestamps can be converted to locations where each scan was taken. Based on this location 216 and fixed transform 218, the controller 118 may calculate the location of the scans with respect to either the sensor origin 210 or robot origin 216. These scans may then be translated into world-frame coordinates using transform 214 which is updated based on the localization process. Accordingly, the scans acquired by the sensor units 114 may be correlated to a location of a robot origin 216 in the environment. As will be discussed in further detail, corresponding the scans to locations of the robot origin 216 will enable calibration of the sensor units 114 by allowing the controller 118 to adjust each scan individually.

FIG. 3A(i) illustrates a robot 102 comprising a range sensor 202 navigating near a flat surface 302, such as a wall or other object, according to an exemplary embodiment. The range sensor 202 emits a plurality of beams 208 across its field of view, wherein a portion of the beams 208 which sense the object 302 are shown, and other beams 208 have been removed for clarity. In the illustrated embodiment, the range sensor 202 is well calibrated. Reference axis 304 is intended to show the proper rotational alignment of the origin 210 of the range sensor 202 for later reference in the figures below. Axis 304 is intended to show the forward direction of the range sensor 202 which, if well calibrated, should be aligned in the illustrated position.

Controller 118 of the robot 102 may produce a computer readable map 306 shown in FIG. 3A(ii) using the range data from the range sensor 202, according to the exemplary embodiment. The object 302 shown on the map 306 is properly localized. More specifically, the object 302 is of the same shape, position, and orientation as shown in FIG. 3A(i) and is at the proper distance from the robot 102, as shown on the computer readable map 306 via a digital robot footprint 308. The footprint 308 represents the approximate area occupied by the robot 102 as viewed from the angle of the map which, in this instance, is a bird's eye (i.e., top-down) view. One can appreciate that the computer readable map 306 shown can be alternatively represented by a computer readable map centered about world origin 220 using transform 214.

Although the incident scan illustrated in FIG. 3A(i) only senses a portion of the object 302, the map 306 contains additional portions not sensed by the sensor 202 in the illustrated instance. The robot 102 is moving left to right on the page, wherein prior scans of the object 302 may have been already mapped in map 306. Since the sensor 202 is in the proper position, the produced map effectively (i.e., because of proper calibration and not a particular choice/ algorithm) joins these discrete measurements to form a continuous object on the map which represents the continuous object 302.

FIG. 3B(i) illustrates the robot 102 shown in FIG. 3A(i) navigating near the object 302, wherein the range sensor 202-a is misaligned along a rotational axis, according to an exemplary embodiment. The misalignment is shown by angle 310 comprising a discrepancy between reference axis 304 shown in FIG. 3A(i) and the current axis 312 of the range sensor 202-a. The range sensor 202-a emits beams 208 which detect a portion 314 of the object 302 to generate a plurality of points 204. Those points 204 may be used to produce a computer readable map 306-a shown in FIG. 3B(ii), wherein the controller 118 may assume the sensor 202-a is in its default position shown in FIG. 3A(i) when translating distance measurements to locations on the map 306-a, according to the exemplary embodiment. Due to the angular error in the position of the sensor 202-a, the portion 314 of the wall sensed by the range sensor 202-a at time tin the incident scan is mapped with an angular tilt. Further, as the robot 102 moves forward (i.e., from left to right in the figure) each subsequent scan will generate a segment 314 of the object 302 with the angular tilt, as shown by two other segments 314 localized before (at t−1) and after (at t+1) the illustrated scan. The location of the robot origin 216 may be tracked when each scan is captured, as shown on the map 306-a wherein the locations of origins 216 of the robot 102 are denoted at t−1, t, and t+1 corresponding to the prior scan, current scan, and subsequent scan, respectively.

Figures 4, 4I:
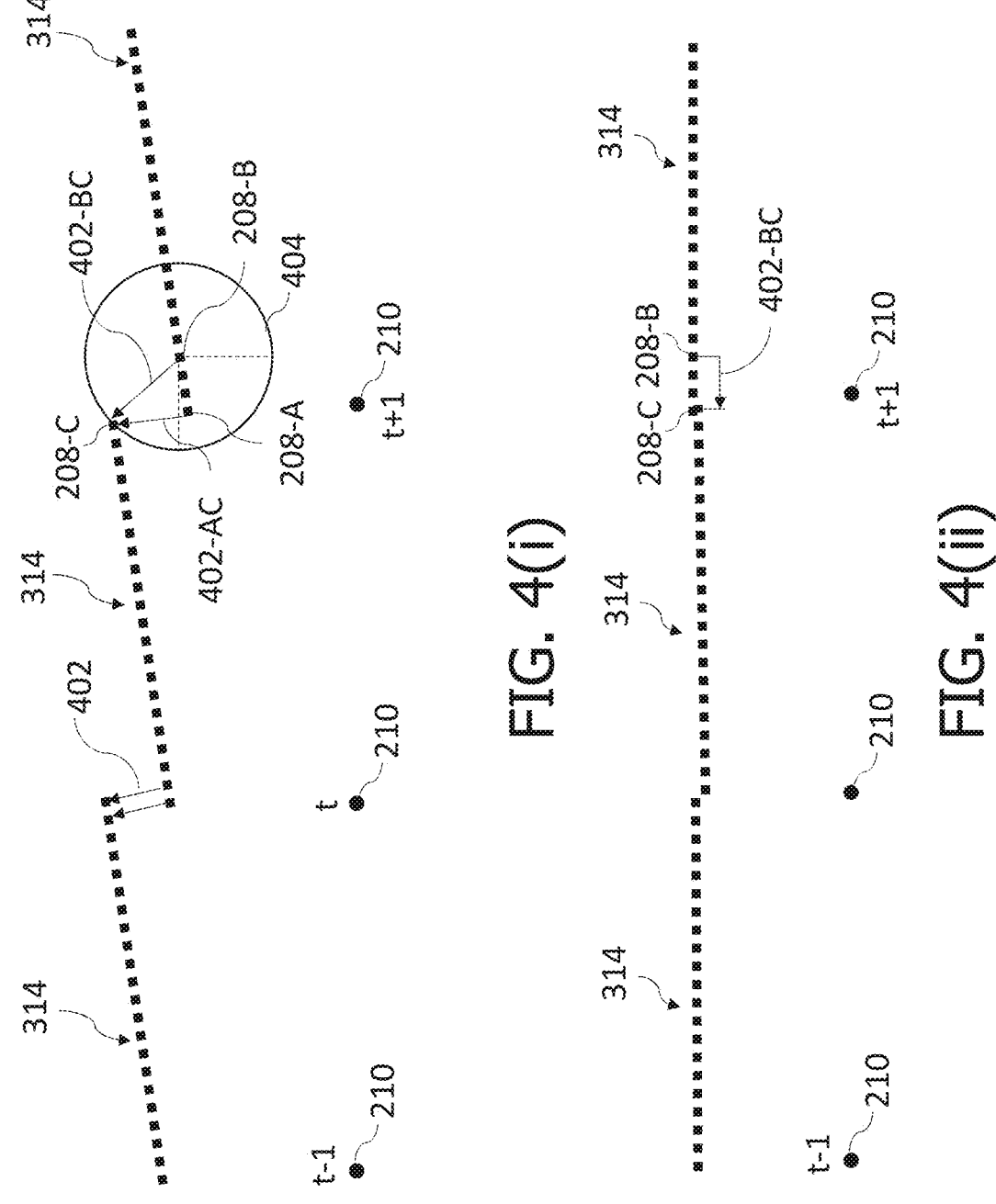
FIG. 4(*i*-ii) illustrate a process of alignment used to calibrate the sensor depicted in FIG. 3B(i), according to an exemplary embodiment.

Since the object 302 is a contingent or continuous surface, the resulting discontinuous segments 314 in the computer readable map 306-a may indicate an error in the pose of the range sensor 202-a. To further illustrate, FIG. 4(i) shows the segments 314 in a close up view, according to an exemplary embodiment. Each segment 314 may comprise a plurality of points 208, each corresponding to a ray 208 from the range sensor 202. The controller 118 of the robot 102 may attempt to align the segments 314 to determine a transform which causes the segments 314 to align. This transform corresponds to a rotation which, when applied to the origin 210 of the sensor 202-a and data therefrom, causes the segments 314 to align. Controller 118 may, for a given point 208 of a given segment 314, determine a nearest neighboring point 208 from a prior scan. In order to ensure the nearest neighboring point 208 is on a same contingent surface as the given point 208, the given point 208 and its nearest neighboring point 208 must be within a threshold distance from each other as shown by circle 404 centered about a point 208-B which illustrates the threshold distance. Points 208 which do not include a nearest neighboring point 208 of a prior scan are not used in determining the alignment.

To illustrate the alignment process, the controller 118 may start at point 208-A and determine its nearest neighboring point of the prior scan is point 208-C. The distance between the points 208-A and 208-C is shown by ray 402-AC. Another point 208-B may comprise the same nearest neighboring point of point 208-C, wherein the distance between the points 208-B and 208-C is shown by ray 402-BC. Controller 118 may rotate the origin point 210 of the sensor 202-a at each location where a scan was taken, the locations being shown above in FIG. 3B(ii) on map 306-a. By rotating each origin 210 and maintaining the same distance measurements as captured by the sensor 202, the segments 314 may be effectively rotated. For example, rotating the origin 210 clockwise by angle 310 causes the segments 314 to be substantially flat (i.e., horizontal in the illustration). For each rotation applied to the origin 210, the magnitude of rays 402-AC, 402-BC, and others not shown for clarity may increase or decrease. Controller 118 may attempt to minimize the magnitude of these rays 402-AC, 402-BC, and others by applying incremental rotations to the origin 210.

The cumulative magnitude of the rays 402-AC, 402-BC, and others not illustrated for clarity, may be referred to herein as "energy" or "sensor energy". Energy, may be calculated using equation 1 below:

$$\text{Energy} = \sum\nolimits_{k_i=1}^{s} \sum\nolimits_{k_j=s_i-N}^{s_j+N} \sum\nolimits_{p_{s_i}} \sigma(t, \|p_{s_i} - c_{s_j}\|)/M \qquad \text{(Eqn. 1)}$$

where $s_i$ is scan i and S is the number of scans considered which may be two or more. j may be equal to i+1, wherein $s_j$ is the scan after $s_i$. N is the number of neighbor points. $p_{si}$ are the points in scan $s_i$, $c_{sj}$ is the closest point to point $p_{si}$ in scan $s_j$. M is a normalization factor and t is the contiguous surface threshold 404. The function σ may represent a sigmoid or step function, where if the distance between point p of scan i and point c of scan j (i.e., the value of $p_{si}-c_{sj}$) exceeds a threshold, σ=0 (i.e., does not satisfy the contiguous surface threshold). Otherwise, σ=|$p_{si}-c_{si}$| (i.e., magnitude of rays 402). To minimize energy, the controller 118 may perform a gradient descent on the energy function of equation 1 by rotating the origin 210 of the sensor 202, which in turn causes points 208 of the scans to move/rotate in the world reference frame. By rotating the origin 210 of the sensor 202, the energy function may increase or decrease, wherein the controller 118 applies iterative rotations to the origin 210 so long as the energy decreases to a minimum.

FIG. 4(ii) shows the segments 314 after the controller 118 has applied the appropriate rotations, according to an exemplary embodiment. The magnitude of ray 402-AC has been reduced to approximately zero and is accordingly not shown. Ray 402-BC may be non-zero after the rotations, but applying further incremental clockwise or counterclockwise rotations would cause ray 402-BC and ray 402-AC to increase in magnitude. The rotations applied to cause the minimization of rays 402 may correspond to the discrepancy between the pose of the sensor 202-a and its default pose. Accordingly, the controller 118 may apply the rotations to both (i) new data arriving from the sensor 202-a, and (ii) the existing points 208 of segments 314 to produce a computer readable map. It is appreciated that only rotational errors in the pose of the sensor 202-a are determined, wherein translational errors are discussed and corrected using cross calibration as described below.

FIG. 5 is a process flow diagram illustrating a method 500 for self-calibration of a range sensor 202, according to an exemplary embodiment. Steps of method 500 may be effectuated via controller 118 executing computer readable instructions from memory 120.

Block 502 includes the controller 118 receiving a plurality of scans from a range sensor 202. The scans each comprise a plurality of points 208 of at least one contingent surface. The plurality of scans includes at least two scans captured sequentially.

Block 504 includes the controller 118 determining, for each incident point 208 of a given scan, a nearest neighboring point 208 within a previous or subsequent scan, the nearest neighboring point being within a threshold distance from the incident point 208. Points 208 which do not include a neighboring point 208 of a previous or subsequent scan within the nearest neighbor threshold (i.e., tin equation 1; 404 in FIG. 4(i)) are not considered in the alignment process described in block 506 below. If no neighboring points lie within the distance threshold, it is highly likely that the two scans detect non-contingent surfaces that cannot be used to calibrate sensors. However, typical range sensors operate at 10-15 Hz or more, wherein it is highly likely that two sequential scans detect at least one contingent surface or portion thereof Block 506 includes the controller 118 minimizing the distance between the points of the given scan and their respective nearest neighboring points from the previous or subsequent scan to determine a transform. The controller 118 minimizes the distance by applying rotations to the points 204. More specifically, the controller 118 rotates the locations where the robot 102 origin 216 or sensor origin 210 was during acquisition of each scan, wherein rotating the origins 210 or 216 causes the points 208 to also rotate. Stated differently, controller 118 may calculate the energy (eqn. 1) between any two scans and minimize the energy by rotating the origin 210 of the sensor 202 equal amounts for both scans. Once the energy is minimized, the rotations applied to the origin 210 correspond to the transform.

Block 508 includes the controller 118 modifying data from the sensor via a digital filter based on the transform. The data from the sensor includes both data collected in the past (i.e., the plurality of scans received in block 502) and any future data collected by the sensor 202. For example, the transform may indicate the sensor 202 is misaligned by 1°. Locations of points 208 captured by the sensor 202 may be rotated by 1° about the sensor origin 210 to digitally account for the physical misalignment of the sensor 202 from its default position. More specifically, the controller 118 updates sensor transform 218 between the robot origin 216 and sensor origin 210 based on the current physical position of the sensor 202, wherein points 208 and range measurements from the sensor 202 are localized based on the updated sensor transform 218.

In some embodiments, the sensors 202 may be coupled to actuator units 108, wherein the controller 118 may adjust the physical position of the sensors 202 in accordance with the transform rather than applying a digital filter to digitally adjust the data from the sensor 202.

Advantageously, method 500 enables self-calibration of a range sensor 202 to detect rotational errors in their positions. Method 500 may be executed in real time as the robot 102 operates or after the robot 102 has completed a route or task. Further method 500 does not rely on any specific external objects or prior knowledge of the environment, other than the presence of typical objects within the environment of any shape or size (e.g., continuous walls). Another benefit of method 500 is the resulting computer readable map comprises thin contingent surfaces. As shown in the map 306-a of FIG. 3B(ii), the flat object 302 comprises a width (measured vertically along the page) due to the angular tilt of segments 314, effectively increasing the size of the object as perceived by the robot 102 and reducing the navigable area available to the robot 102 due to uncertainty caused by miscalibration. By applying the transform which aligns the scans to minimize the energy, the effective width of the object 302 is reduced to a thin line which more accurately represents the location and size of the flat surface of the object 302.

Figure 6:
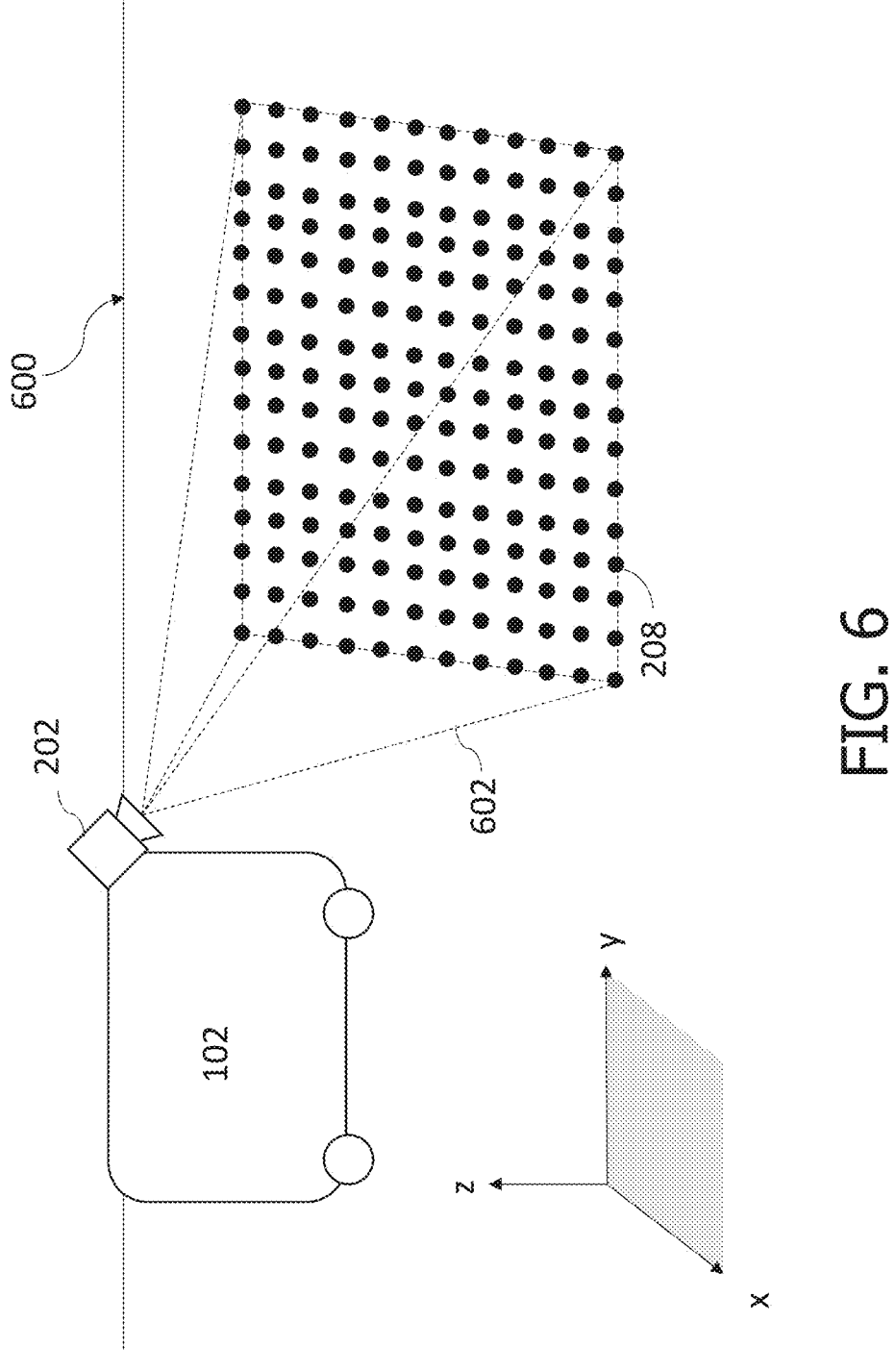
FIG. 6 illustrates a range sensor configured to sense floor around a robot, wherein the floor enables calibration along one translational axis, according to an exemplary embodiment.

Before discussing cross-calibration methods used to determine translational errors in the pose (i.e., x, y, z position) of a range sensor 202, some range sensors 202 may be self-calibrated using method 500 to determine translational errors along at least one axis depending on their configuration. FIG. 6 illustrates a sensor 202 configured to, at least in part, sense a flat floor 600, according to an exemplary embodiment. Sensor 602 may comprise, for example, a depth camera, 2 or 3-dimensional scanning LiDAR, or other range sensor described herein. The field of view 602 of the sensor 202 is shown as encompassing the floor 600 near the robot 102. Controller 118 of the robot 102 may execute method 500 to determine a digital filter to correct rotational errors in the pose of the sensor 202, however the digital filter may not be able to correct for translational errors. Floors 600 are unique objects of an environment since floors are always present, contingent, at the same location (i.e., the z=0 plane), and are substantially flat. Thus, a floor provides a useful reference to calibrate the sensor 202 at least along the z axis. Since method 500 corrects for rotational errors of the sensor 202 pose, the plane formed by the plurality of points 208 may be substantially parallel to the z=0 plane. Any discrepancy between the plane formed by points 208 and the z=0 plane may correspond to the error in the sensor 202 pose along the z axis. While cross-calibration methods disclosed herein account for z axis errors, use of floor 600 to calibrate along the z axis may be useful in yielding a more robust value for the z axis pose parameter without reliance on a second sensor. That is, measuring the z-axis error in the pose of the sensor 202 provides further constraints for the cross-calibration procedures described in the following figures.

Rotational errors may also be determined using the measured floor plane along two degrees of freedom. For instance, if the plane formed by the points 208 is flat (i.e., p=z, with p being the normal vector of the plane and z being the z-direction vector) but has an average value of C≠0 (i.e., the sensor 202 is producing larger or smaller range measurements than its default pose), the z-axis misposition of the sensor 202 corresponds to C. If the plane however is tilted (i.e., p≠z) errors in pitch (y-axis rotation) and roll (x-axis rotation) may be determined. Yaw (z-axis rotation) cannot be determined as changes in yaw would only yield different areas of the flat floor sensed, and not changes in the height or angle of the plane of the points 208. It is assumed that the floor extends beyond where points 204 are localized, and thus there is no known reference "area of the floor" which can be used as a reference, unlike pitch and roll which operate under the assumption that the floor is flat and can measure the 'flatness' of the measured plane. Such determination of rotational errors, however, may provide a plurality of degenerate solutions using only the floor-plane itself, wherein it is preferred to utilize floor-plane error measurement as a constraint to other processes disclosed herein (e.g., to ensure gradient descent reaches a global minimum as opposed to a local one). Alternatively the floor-calibration method in FIG. 6 may be used to self-calibrate an anchor sensor in at least one additional degree of freedom, z.

Self-calibration as used herein may often only be able to correct rotational errors in a pose of a sensor unless the sensor continuously detects floor, such as the sensor 202 illustrated which is aimed downward (e.g., to detect cliffs or impassable drops in the floor). However, given the disclosure in FIG. 6, if the sensor detects floor, the self-calibration process may further correct for z-axis errors. For the purpose of generalizing the disclosure, where self-calibrating z-axis errors may not always be available for all sensors 202 of a robot 102, the following figures will be described as though floor is not sensed by the sensors to be calibrated below.

One skilled in the art may appreciate that the designation of the floor corresponding to the z=0 plane is not intended to be limiting, as the plane of the floor may be defined as z=C with C being a constant. In FIG. 2B, the origin 216 of the robot 102 is defined on the z=0 plane (i.e., on the floor), but the origin 216 may similarly be at the z=C height, or a different constant height from the floor.

FIG. 7A illustrates a robot 102 comprising two range sensors 202 navigating near a flat object 302, according to an exemplary embodiment. Both sensors 202 in this embodiment are in their default, well-calibrated positions as denoted by the location of their respective origins 210 and their reference axes 304. The controller 118 may process the range measurements from the two sensors 202 to produce a computer readable map 306 comprising a single object 302 localized thereon. Only one object 302 is included on the map 302 because both sensors 202 localize the object 302 at the same locations due to the two sensors 202 being well calibrated. In FIG. 7B, an error is introduced into sensor 202-1 while the other sensor 202-2 is in its proper default position, the error comprising a translation 702 and rotation error 704, according to an exemplary embodiment. Reference axis 304, shown in FIG. 7A, is illustrated as representing the default orientation and location of the origin 210-D (white circle) of the sensor 202-1 and is in a different location and orientation from axis 706, representing the current forward-facing axis of the sensor 202-1 and location of the current origin 210-1 (black circle). The same reference axis 304 is shown for sensor 202-2, also corresponding to the default (i.e., well calibrated) position for the sensor 202-2 origin 210-2.

Although the two sensors 202-1, 202-2 are shown to be sensing the object 302 at the same time, there is no requirement only contemporaneously captured scans are able to be compared. Rather, the scans 302-1, 302-2 selected for comparisons are ones which (i) originate from two different sensors 202-1, 202-2; and (ii) sense the same object (i.e., are within a threshold distance from each other). For instance, sensor 302-1 may sense the object 302 at a first time, wherein the robot 102 later turns which enables another sensor 202-2 to sense at least a portion of the object 302. Cross calibration methods may still be applicable for these two scans despite them being acquired at different times and/or when the robot 102 is in different positions.

Controller 118 may process range data of beams 208 emitted from both sensors 202-1, 202-2 whilst assuming both are in their default positions and/or prior calculated positions (e.g., using the methods herein at a prior time) to produce a computer readable map 306. Due to the unaccounted-for error in the pose of sensor 202-1, the single object 302 is localized in two locations 302-1 and 302-2. Object 302-2 is localized by sensor 202-2 and thus is in the proper location and orientation on the map 306. Object 302-1 includes some tilt due to the rotational error 704 in the pose of sensor 202-1. Further, object 302-1 does not intersect object 302-2 at their respective midpoints 708-1 and 708-2, indicating the presence of translation error 702. Midpoints 708 are shown purely for illustrative purposes and may not be measured or detected by the controller 118. Although shown as continuous surfaces on map 306, it is appreciated that objects 302-1, 302-2 comprise a plurality of points 208 or pixels.

Controller 118 may align the two objects 302-1 and 302-2 using the same method as described above in FIG. 4 for self-calibration. That is, the controller 118 may, for each point 208 of object 302-1, detect a nearest neighboring point 208 of object 302-2 within a threshold distance. This threshold may be different or the same as threshold 404 or tin equation 1. Controller 118 may then adjust the rotation and/or position of origin 210 of the sensor 202-1, thereby changing the rotation and position of object 302-1, in order to reduce the distance between the point 208 and its nearest neighboring point 208. The translations and/or rotations which minimize the distance may correspond to the errors 702, 704 in the pose of the sensor 202-1. The controller 118 may perform iterative rotations/translations to determine which rotations/translations reduce the net magnitude of the nearest neighbor distances. Stated another way, the controller 118 iteratively (e.g., via gradient descent) reduces cross sensor energy, described in equation 2 below.

As used herein, an anchor sensor corresponds to a sensor which is used as reference to calibrate another sensor. In the embodiment shown in FIG. 7B, sensor 202-2 is the anchor sensor used as reference to calibrate the sensor 202-1. Similarly, as used herein, an anchor measurement, point, or point cloud corresponds to the measurement from the anchor sensor used as reference to calibrate another sensor. In the illustrated embodiment, object 302-2 serves as the anchor measurement used as reference to calibrate sensor 202-1 based on measurement 302-1.

Cross-sensor calibration may also be defined with respect to sensor energy as described above. Cross-sensor calibration may follow equation 2 below:

$$\text{Energy}_{cross} = \sum_{k_i=1}^{s} \sum_{p_{s_i}} \sigma \left\| p_{s_i} - c_{anchor} \right\| / M \qquad \text{(Eqn. 2)}$$

With $c_{anchor}$ corresponding to the nearest neighboring point of object 302-2 to the given point $p_{s_i}$ of object 302-1. The summations are for each point $p_{s_i}$ of each scan $S_i$ for all S scans, S being an integer equal to or greater than 1. $\sigma$ represents the contiguous threshold which is zero if the distance between the nearest neighboring points $p_{s_i}$ and $c_{anchor}$ is greater than a threshold, else its value is equal to $|p_{s_i} - c_{anchor}|$. M is a normalizing constant. The points $c_{anchor}$ used for the alignment may be from any scan from the anchor sensor and is not limited to scans captured concurrently with the scan of $p_{s_i}$. In some embodiments, $c_{anchor}$ represents an entire point cloud of an environment constructed from an aggregation of scans from the anchor sensor.

Although FIG. 7B shows two scans 302-1, 302-2 of object 302 being captured concurrently, one skilled in the art may appreciate that this is not limiting. For example, sensors 202-1, 202-2 may not include overlapping fields of view, requiring the robot 102 to execute a turn for both sensors 202-1 and 202-2 to sense object 302 prior to the controller 118 using the object 302, and scans thereof, to cross calibrate the sensor 202-1. Unlike self-energy calibration, wherein an object detected in one scan is highly likely to also be detected in a previous or subsequent scan, cross-sensor calibration may require additional time or scans for both sensors 202-1, 202-2 to sense a same object 302, or portion thereof, if their fields of view are not overlapping or are only overlapping in part. Minimizing the cross-sensor energy function yields a transform which corresponds to the transform between the two sensor origins 210, wherein the controller 118 may deduce the transform 218 between the origin 210 of sensor 202-1 (including the errors 702, 704) therefrom.

Advantageously, calibration errors of the sensor 202-1 may be corrected without the use of any additional equipment, measurements, or specific objects and may be performed using any detectable surface sensed by both sensors 202-1, 202-2. Further, cross calibration allows for scans from both sensors 202-1, 202-2 to agree on the location of an object, reducing the apparent "thickness" of the object, and enabling the robot 102 to make more precise motion planning decisions. To illustrate, object 302 on map 306 in FIG. 7B(ii) is shown as being in both locations 302-1 and 302-2, wherein controller 118 may be unable to distinguish which is correct and which is in error, thereby causing the controller 118 to presume both "objects" 302-1 and 302-2 are present and occupying the illustrated space in FIG. 7B.

Objects occupying more space on map 306 than they do in reality may cause the controller 118 of the robot 102 to be unable to plan paths through narrow aisles because the walls of the aisle may appear thicker, further narrowing the aisle. In some instances, overly thick walls may cause task performance degradation if, e.g., the robot 102 is a floor cleaning robot, wherein it would be difficult to clean corners near the walls if the robot 102 is uncertain where the wall is located.

Figure 7C:
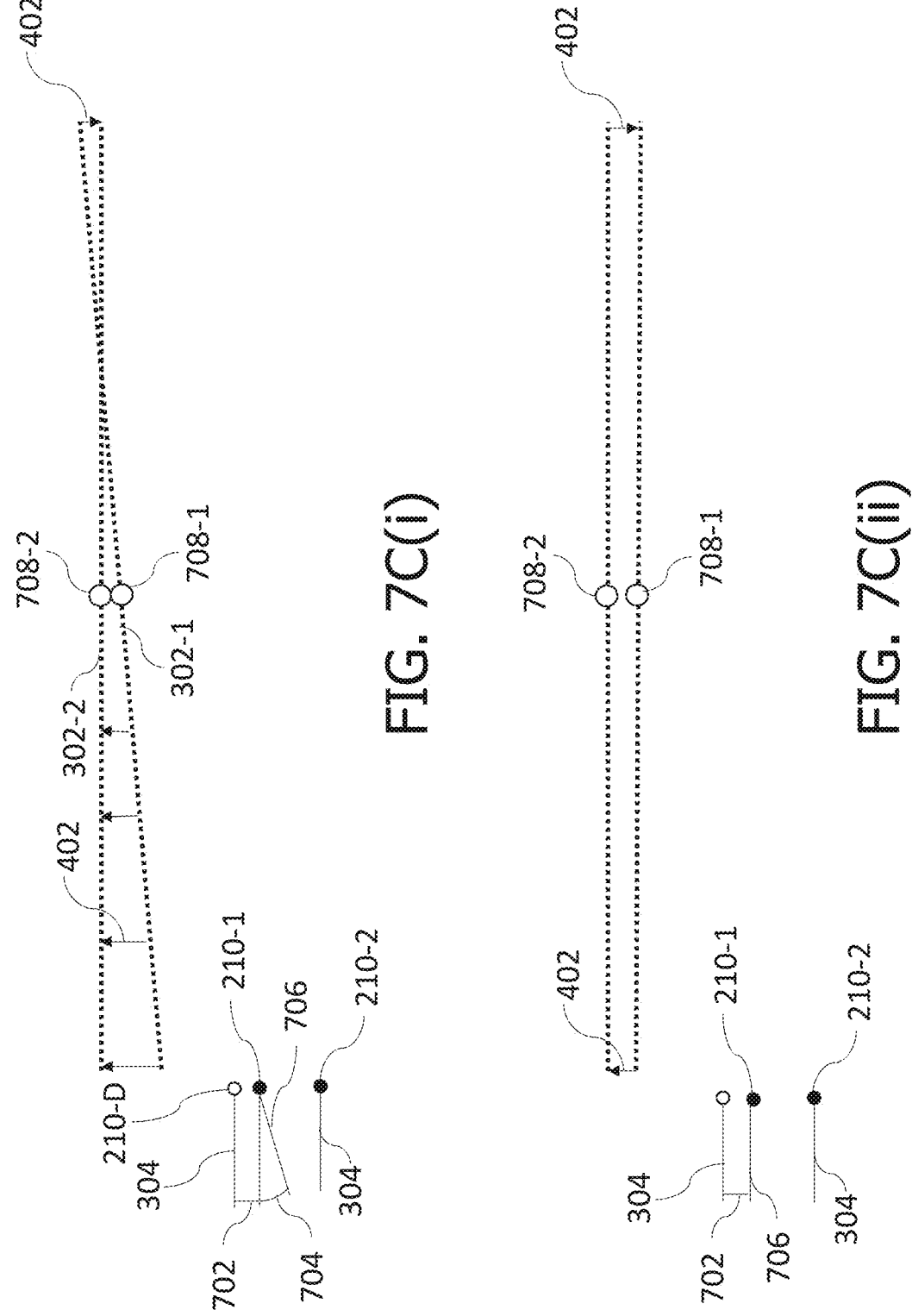
FIG. 7C(i-ii) illustrate a cross-calibration alignment used to calibrate one sensor with respect to an anchor sensor, according to an exemplary embodiment.

To better illustrate the alignment process used for cross sensor calibration, FIG. 7C(i) illustrates a close-up view of the computer readable map 306 comprising the object 302 localized twice at locations 302-1, 302-2 due to the error in the pose of sensor 202-1, according to an exemplary embodiment. To align the measurement 302-1 with the measurement 302-2, the controller 118 may: determine a nearest neighboring point of measurement 302-2 for each point of measurement 302-1 and, if the neighboring points are within the contiguous threshold a, attempt to minimize the distance between the neighboring points via rotations and translations. Specifically, by rotating/translating the origin 210-1 of sensor 202-1, the measurement 302-1 therefrom is also rotated/translated. Midpoints 708-1, 708-2 are shown for illustrative clarity only, and do not necessarily represent any point detected or determined by the controller 118 to be the midpoint of the measurements 302-1, 302-2.

A plurality of error measurements 402 are shown, each error 402 represents a distance between two nearest neighboring points of the two measurements 302-1, 302-2. The controller 118 may begin with a rotation on origin 210-1 to attempt to minimize the errors 402. Accordingly, as shown next in FIG. 7C(ii), a clockwise rotation is applied to the origin 210-1 which causes the measurement 302-1 to rotate such that it is parallel with measurement 302-1, according to the exemplary embodiment. The clockwise rotation corresponds to the angular error 704 in the pose of the sensor 202-1. As shown, the errors 402 have been reduced, and are now all parallel and pointing upwards. Accordingly, to minimize the errors 402 further, the controller 118 may translate the origin 210-1 upwards by an amount equal to the error 402 and error 702.

FIG. 8 is a process flow diagram illustrating a method 800 for a controller 118 of a robot 102 to calibrate two sensors 202, according to an exemplary embodiment. Steps of method 800 may be effectuated via controller 118 executing computer readable instructions from memory 120.

It is appreciated that an anchor sensor, as used herein, must comprise a sensor 202 mounted on the robot 102 such that it typically includes marginal or no translational error in its pose. Sensors 202 mounted on the robot 102 may be coupled thereto using various configurations of mechanical couplers with varying tolerability to vibrations, bumps, and other perturbations. Thus, the sensor 202 selected as the anchor sensor in method 800 should comprise one which is rigidly mounted such that it only includes errors along its rotational axis and negligible errors in translation. Anchor sensors may also comprise sensors which are able to be calibrated using alternative methods, such as those described in FIG. 6 which utilize floor surfaces. In some instances, the pose of the anchor sensor 202 may be adjustable and configured by a skilled operator using separate calibration methods prior to the use of the robot 102 by an end-user. For example, reference objects of known size/shape may be placed at known locations from the anchor sensor and used to calibrate the sensor via manual mechanical adjustments by the skilled operator as an end of line calibration procedure before an end-user operates the robot 102. These calibration procedures using external objects at known locations often require additional space, objects, and time to execute but yield highly accurate pose information, wherein errors may be corrected by skilled operators. Advantageously, only the one anchor sensor 202 is required to be well calibrated using these additional calibration procedures which may accelerate the rate at which robots 102 are configured and tested by a manufacturer.

Block 802 includes the controller 118 self-calibrating a first sensor and an anchor sensor to determine respective rotation errors in the pose of the first and second sensors. The self-calibration of the first sensor and anchor sensor may be performed by the controller 118 executing method 500 independently for both sensors.

Controller 118 may apply the rotations to the data from the first and anchor sensors to produce transformed data. The transformed data is then used for cross-calibration in block 804.

Block 804 includes the controller 118 performing a cross-calibration between the first sensor and anchor sensor to determine rotation and translational errors of the first sensor. The cross-calibration includes the controller 118 executing and minimizing equation 2 by applying iterative rotations and/or translations to the transformed data from the first sensor. More specifically, the controller 118 aligns transformed data from the first sensor to the transformed data from the anchor sensor, wherein the measurements being aligned include points 208 of a same object or a portion thereof. Points 204 from both sensors may be determined to correspond to the same object if they lie within a contiguous surface threshold. The alignment yields rotation and translations which correspond to the errors in the pose of the first sensor.

According to at least one non-limiting exemplary embodiment, if either the first or anchor sensor typically detect floor, controller 118 may further perform self-calibration along the z-axis as described in FIG. 6 above after the cross-calibration.

Block 806 includes the controller 118 applying the rotation and translation to both (i) the transformed data from the first sensor, and (ii) any new data arriving from the sensor. That is, the rotations and translations determined in block 802 and 804 are applied to the data from the first sensor, causing the data from the first sensor to align substantially with the data from the anchor sensor. Once the existing data from the first sensor is corrected, any new measurements from the first sensor may be adjusted via the controller 118 adjusting a local sensor transform 218 between the origin 216 of the robot 102 and sensor origin 210. The adjustment made by the update to the sensor transform 218 corresponds to the rotations and translations determined in blocks 802-804.

Block 808 includes the controller 118 aggregating the data from the first and anchor sensor into an anchor point cloud. That is, once the first sensor is calibrated, data therefrom may be added into the point cloud data of the anchor sensor, forming a part of the anchor point cloud. In some embodiments where the controller 118 includes limited processing resources, block 806 may be ignored or skipped until after the robot 102 has completed its tasks because aggregating multiple point clouds may allow the controller 118 to process substantially more points 208 when performing alignments in block 804.

Method 800 may then be repeated by replacing the first sensor with another, third sensor of the robot 102. The anchor point cloud formed by aggregating data from both the first and second sensors (with rotations/translation errors accounted for) may then be utilized as reference to cross-calibrate the third sensor in block 804 once the third sensor is self-calibrated in block 802.

Method 800 may be executed in real time as the robot 102 operates, after the robot 102 has completed a route/task, or both. For example, the self-calibration of block 802 may be performed in real time as each sensor collects new point cloud data or after a route/task is executed using an aggregate of the scans collected during executing the route/task. Block 804 may be executed in real time, however as discussed above, it may require additional time and/or actions by the robot 102 for the first and anchor sensors to both detect a same object if their fields of view do not overlap.

In one non-limiting exemplary embodiment, method 800 may be executed following a user input requesting the robot 102 execute a "calibration route", causing the robot 102 to navigate a short (e.g., 1-5 minute) route. The route may cause the robot 102 to pass by at least one object such that it is detected by both the first and anchor sensors, such as a circular path or loop. The route may be predetermined, (pseudo)random, or may be performed while the robot 102 is under manual control of the user. Sensor data collected by the first and anchor sensor during the calibration route may then be processed following method 800 to calibrate the first sensor. Use of a short "calibration route" may enable quick calibration of the sensors of the robot 102. In some instances, method 800 may be performed after the robot 102 has navigated any route and is not limited to being performed following execution of a "calibration route".

Figure 9:
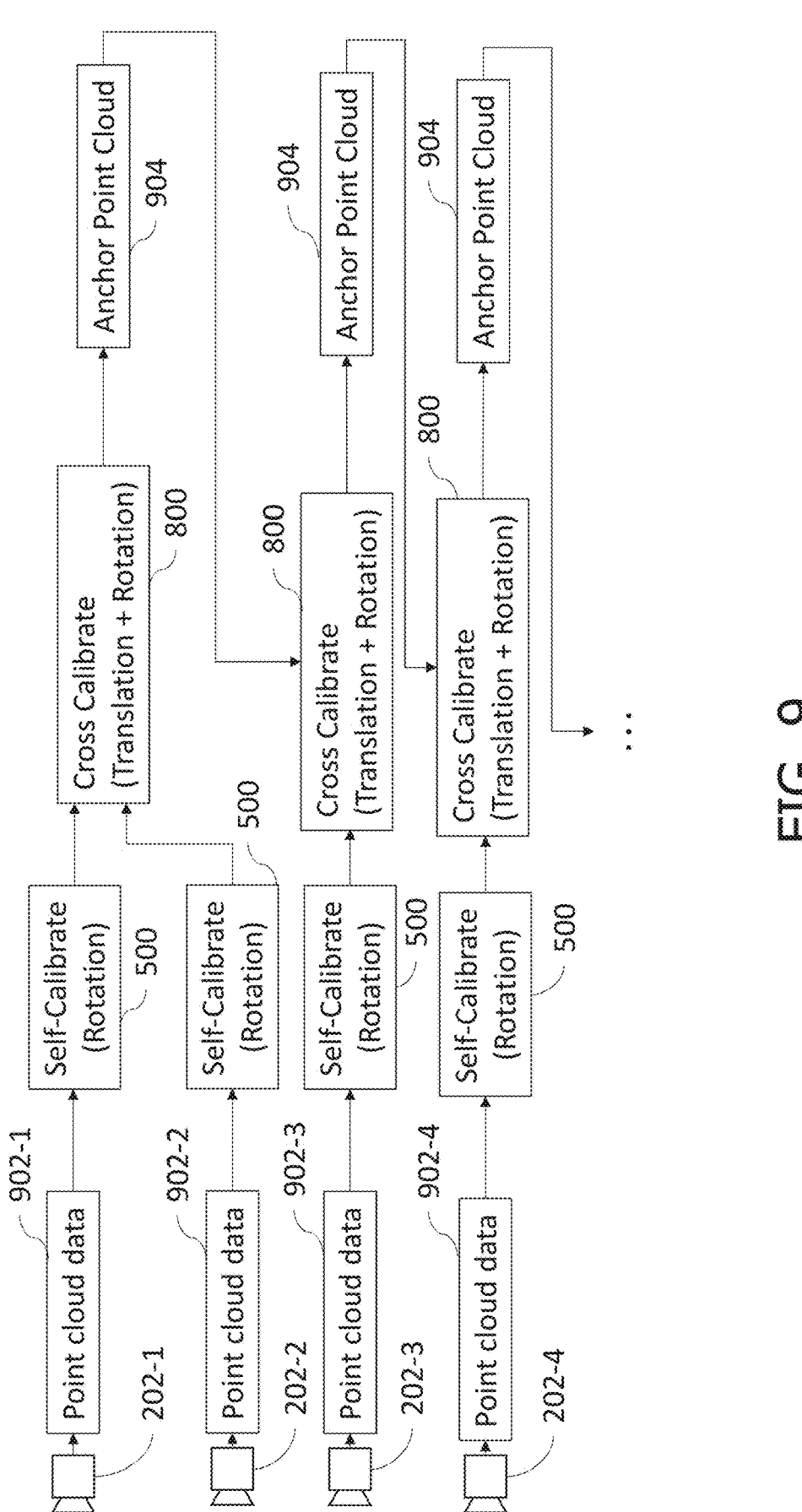
FIG. 9 is a system block diagram configured to calibrate a plurality of range sensors on a robot, according to an exemplary embodiment.

FIG. 9 illustrates a system 900 configured to calibrate a plurality of sensors 202 on a robot 102, according to an exemplary embodiment. Functional blocks shown are illustrative of either data stored in memory 120 and/or computer readable instructions executed by the controller 118 to process the stored data.

The robot 102 in this embodiment has at least four (4) range sensors 202-1, 202-2, 202-3, and 202-4. Each range sensor produces a respective point cloud 902-1, 902-2, 902-3, and 902-4 as the robot 102 navigates through the environment. Sensor 202-1 may serve as the anchor sensor in this embodiment. Sensor 202-1 may comprise of a rigidly mounted sensor which is least prone to calibration drift of the plurality of other sensors 202-2, 202-3, etc. Preferably, though not required, the anchor sensor 202-1 should sense the floor and be able to be calibrated along the z-axis.

The anchor sensor 202-1 point cloud 902-1 may first be self-calibrated using method 500 described in FIG. 5 above. In short, self-calibration involves the controller 118 aligning neighboring points 204 from sequential scans of this sensor 202-1 which are within a threshold distance from each other, wherein the alignment yields a rotation corresponding to rotational errors in the sensor 202-1 pose. Once the rotational error is detected, a digital filter or transform may be applied to all of the scans of the point cloud 902-1 to 'correct' the rotational error. Specifically, for each scan, the controller 118 applies the rotations to the origin 210 of the sensor 202-1. By maintaining the ranges as measured by the sensor 202-1 at that location, the rotations will cause the points 204 measured therefrom to also rotate about the origin 210. The controller 118 may apply this rotation for every location where a scan was acquired to produce a self-calibrated anchor point cloud. The controller 118 may also do the same process for a second sensor 202-2, that is: self-calibrate, determine rotational errors, and apply corrections to the point cloud 902-2.

Once both point clouds 902-1, 902-2 are corrected using self-calibration methods, those point clouds 902-1, 902-2 may be then compared in method 800 described in FIG. 8 above for cross-calibration. In cross-calibration, the controller 118 applies the same nearest neighbor distance calculation (i.e., "Energy" in equation 2) and minimizes the distances along rotation and translation axis. Unlike self-calibration, there is no restriction on the controller 118 to only measure cross sensor energy between sequential scans as often sensor 202-1 and 202-2 may sense different areas, and require the robot 102 to turn or move in order to sense the same areas/objects. The cross-sensor calibration block 800 yields rotational and translational errors in the pose of the sensor 902-1 which cause the two point clouds 902-1, 902-2 to disagree on the locations of objects. The translations and rotations determined in the cross-calibration may be applied to the point cloud 902-2.

Point clouds 902-1 and 902-2 (corrected) can then be aggregated together to form a new anchor point cloud 904 comprising measurements from both sensors 902-1 and 902-2 which have been corrected for errors in the pose of the sensors 202-1, 202-2. Aggregating both point clouds 902-1, 902-2 together may provide more surfaces from which to perform comparisons when cross calibrating other sensors 202-3, 202-4, etc. at the cost of added computational complexity. These additional surfaces provide a more robust constraint on the determined translation/rotations in later cross-calibration steps. One skilled in the art may determine to aggregate the cross-calibrated point clouds 902 together as shown based on the computational capabilities of the controller 118 and if the method is performed online (i.e., in real times as the robot 102 navigates) or offline (i.e., after navigating and/or not performing tasks) as well as the number of sensors 202 on the robot 102 to be calibrated.

According to at least one non-limiting exemplary embodiment, following cross calibration, a residual error (i.e., non-zero "Energy") may still be present due to, e.g., noise. Accordingly, in some embodiments, a threshold may be implemented for merging of two point clouds 902-1, 902-2 into the new anchor point cloud. That is, if the residual energy which cannot be minimized further is greater than the threshold amount, the controller 118 may skip the merging of point cloud 902-2 with point cloud 902-1. As stated above, an advantage of the present system is the minimizing of the effective thickness of objects (e.g., FIG. 3B(ii) versus 3B(i) or FIG. 7B(ii) versus 7B(i)). In some instances, it may be impossible to fully reduce the energy to zero, thereby leaving some residual thickness to the objects. By merging the two point clouds together, the residual thickness of the objects becomes the basis for comparison which may propagate errors in later cross calibrations.

According to at least one non-limiting exemplary embodiment, an additional functional block comprising of floorplane calibration along the z-axis may be implemented immediately before or immediately after the self-calibration blocks 500 for each sensor, prior to each respective sensor being cross calibrated. Such functional block, however, may only be applicable to select sensors 202 which would detect a floor in an obstacle-free environment.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term "includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A method for calibrating sensors on a robot, comprising:

receiving a point cloud from a first sensor on the robot, wherein the point cloud comprises an aggregate of a sequence of scans captured from the first sensor during navigation of the robot through an environment, the scans each comprise a plurality of points generated from a respective plurality of range measurements at a location of a sensor origin point of the first sensor;

rotating the sensor origin point of each scan to minimize distance between their respective nearest neighboring points of subsequent or prior scans in the sequence of scans, wherein the robot moves during acquisition of the sequence of scans, wherein the rotation that minimizes the distance corresponds to a rotational transform, the rotational transform comprising a self-calibration; and applying the rotational transform to (i) data from the first sensor, and (ii) the sensor origin point for each scan using the rotational transform;

cross-calibrating the first sensor by aligning the point cloud from the first sensor to a second point cloud from a second sensor on the robot, the second point cloud comprising an aggregate of sequential scans from the second sensor during navigation of the robot, each scan of the second sensor comprising a plurality of points generated from respective range measurements at locations of a sensor origin of the second sensor, wherein the aligning yields a second transform comprising a translation and rotation; and applying the second transform to (i) data from the first sensor, and (ii) the sensor origin point of the first sensor for each scan.

2. The method of claim 1, further comprising:

self-calibrating the second sensor prior to the cross-calibration by rotating the sensor origin point of each scan from the second sensor to minimize distance to their respective nearest neighboring points of prior or subsequent scans, wherein the rotation that minimizes the distance yields a third rotational transform; and applying the third rotational transform to (i) data from the second sensor, and (ii) the sensor origin for each scan of the second sensor prior to cross-calibration.

3. The method of claim 2, further comprising:

aggregating the first point cloud, with the rotational transform and second transform applied thereto, with the second point cloud, the second point cloud having the third rotational transform applied thereto, to yield a third point cloud; and utilizing the third point cloud to produce a computer readable map of an environment.

4. The method of claim 1, wherein, the respective nearest neighboring points are within a threshold distance.

5. The method of claim 1, wherein, the cross-calibration causes the point cloud of the first sensor to align substantially with the second point cloud of the second sensor.

6. The method of claim 1, further comprising:

calculating cross-sensor energy based on a cumulative distance between nearest neighboring points of the first point cloud and points of the second point cloud which are within a threshold distance to each other; and minimizing the cross-sensor energy by applying iterative rotations and translations to the sensor data of the first sensor, wherein the rotations and translations applied to achieve minimum cross-sensor energy corresponds to the second transform.

7. A robotic system for calibrating plurality of sensors on a robot, comprising:

a plurality of sensors coupled to the robotic system;

a memory comprising computer readable instructions stored thereon; and at least one controller configured to execute the computer readable instructions to:

receive a point cloud from a first sensor on the robotic system, wherein the point cloud comprises an aggregate of a sequence of scans captured from the first sensor during navigation of the robot through an environment, the scans each comprise a plurality of points generated from a respective plurality of range measurements at a location of a sensor origin point of the first sensor;

rotating the sensor origin point of each scan to minimize distance between their respective nearest neighboring points of subsequent or prior scans in the sequence of scans, wherein the robot moves during acquisition of the sequence of scans, wherein the rotation that minimizes the distance corresponds to a rotational transform, the rotational transform comprising a self calibration;

apply the rotational transform to (i) data from the first sensor, and (ii) the sensor origin point for each scan using the rotational transform;

cross-calibrate the first sensor by aligning the point cloud from the first sensor to a second point cloud from a second sensor on the robotic system, the second point cloud comprising an aggregate of sequential scans from the second sensor during navigation of the robot, each scan of the second sensor comprising a plurality of points generated from respective range measurements at locations of a sensor origin of the second sensor, wherein the aligning yields a second transform comprising a translation and rotation; and apply the second transform to (i) data from the first sensor, and (ii) the sensor origin point of the first sensor for each scan.

8. The robotic system of claim 7, wherein the at least one controller is further configured to execute the computer readable instructions to:

self-calibrate the second sensor prior to the cross-calibration by rotating the sensor origin point of each scan from the second sensor to minimize distance to their respective nearest neighboring points of prior or subsequent scans, wherein the rotation that minimizes the distance yields a third rotational transform; and apply the third rotational transform to (i) data from the second sensor, and (ii) the sensor origin for each scan of the second sensor prior to cross-calibration.

9. The robotic system of claim 8, wherein the at least one controller is further configured to execute the computer readable instructions to:

aggregate the first point cloud, with the rotational transform and second transform applied thereto, with the second point cloud with the third rotational transform applied thereto, to yield a third point cloud; and utilize the third point cloud to produce a computer readable map of an environment.

10. The robotic system of claim 7, wherein, the cross-calibration causes the point cloud of the first sensor to align substantially with the second point cloud of the second sensor.

11. The robotic system of claim 7, wherein the at least one controller is further configured to execute the computer readable instructions to:

calculate cross-sensor energy based on a cumulative distance between nearest neighboring points of the first point cloud and points of the second point cloud which are within a threshold distance to each other; and minimize the cross-sensor energy by applying iterative rotations and translations to the sensor data of the first sensor, wherein the rotations and translations applied to achieve minimum cross-sensor energy corresponds to the second transform.

12. A non-transitory computer readable storage medium comprising a plurality of computer readable instructions stored thereon which, when executed by at least one controller of a robot, cause the robot to:

receive a point cloud from a first sensor on the robot, wherein the point cloud comprises an aggregate of a sequence of scans captured from the first sensor during navigation of the robot through an environment, the scans each comprise a plurality of points generated from a respective plurality of range measurements at a location of a sensor origin point of the first sensor;

rotate the sensor origin point of each scan to minimize distance between their respective nearest neighboring points of subsequent or prior scans in the sequence of scans, wherein the robot moves during acquisition of the sequence of scans, wherein the rotation that minimizes the distance corresponds to a rotational transform, the rotational transform comprising a self-calibration; and apply the rotational transform to (i) data from the first sensor, and (ii) the sensor origin point for each scan using the rotational transform;

cross-calibrate the first sensor by aligning the point cloud from the first sensor to a second point cloud from a second sensor on the robot, the second point cloud comprising an aggregate of sequential scans from the second sensor during navigation of the robot, each scan of the second sensor comprising a plurality of points generated from respective range measurements at locations of a sensor origin of the second sensor, wherein the aligning yields a second transform comprising a translation and rotation; and apply the second transform to (i) data from the first sensor, and (ii) the sensor origin point of the first sensor for each scan.

13. The non-transitory computer readable storage medium of claim 12, wherein the at least one controller is further configured to execute the computer readable instructions to:

self-calibrate the second sensor prior to the cross-calibration by rotating the sensor origin point of each scan from the second sensor to minimize distance to their respective nearest neighboring points of prior or subsequent scans, wherein the rotation that minimizes the distance yields a third rotational transform; and apply the third rotational transform to (i) data from the second sensor, and (ii) the sensor origin for each scan of the second sensor prior to cross-calibration.

14. The non-transitory computer readable storage medium of claim 13, wherein the at least one controller is further configured to execute the computer readable instructions to:

aggregate the first point cloud, with the rotational transform and second transform applied thereto, with the second point cloud with the third rotational transform applied thereto, to yield a third point cloud; and utilize the third point cloud to produce a computer readable map of an environment.

15. The non-transitory computer readable storage medium of claim 12, wherein, the cross-calibration causes the point cloud of the first sensor to align substantially with the second point cloud of the second sensor.

16. The non-transitory computer readable storage medium of claim 12, wherein the at least one controller is further configured to execute the computer readable instructions to:

calculate cross-sensor energy based on a cumulative distance between nearest neighboring points of the first point cloud and points of the second point cloud which are within a threshold distance to each other; and minimize the cross-sensor energy by applying iterative rotations and translations to the sensor data of the first sensor, wherein the rotations and translations applied to achieve minimum cross-sensor energy corresponds to the second transform.

17. A robotic system for calibrating sensors, comprising:

at least two sensors coupled to the robotic system on a robot;

a memory comprising computer readable instructions stored thereon; and at least one controller configured to execute the computer readable instructions to:

receive a first point cloud from a first sensor on the robot of the at least two sensors, wherein the first point cloud comprises an aggregate of a sequence of scans captured from the first sensor during navigation of the robot through an environment, the scans each comprise a plurality of points generated from a respective plurality of range measurements at a location of a sensor origin point of the first sensor;

rotate the sensor origin point of each scan to minimize distance between their respective nearest neighboring points of subsequent or prior scans in the sequence of scans, wherein the robot moves during acquisition of the sequence of scans, wherein the rotation that minimizes the distance corresponds to a first rotational transform, the first rotational transform comprising a self-calibration;

apply the first rotational transform to (i) data from the first sensor, and (ii) the sensor origin point;

receive a second point cloud from a second sensor on the robot of the at least two sensors, wherein the second point cloud comprises an aggregate of a sequence of scans captured from the second sensor during navigation of the robot, each scan of the second sensor comprise a plurality of points generated from respective range measurements at locations of a sensor origin point of the second sensor;

rotate the sensor origin point of each scan of the second sensor to minimize distance between their respective nearest neighboring points of subsequent or prior scans in the sequence of scans, wherein the robot moves during acquisition of the sequence of scans, wherein the rotation that minimizes the distance corresponds to a second rotational transform, the second rotational transform comprising a self-calibration;

apply the second rotational transform to (i) data from the second sensor, and (ii) the sensor origin point for each scan of the second sensor;

calculate cross-sensor energy based on a cumulative distance between nearest neighboring points of the first point cloud and points of the second point cloud which are within a threshold distance to each other;

cross-calibrate the first sensor by aligning the point cloud from the first sensor to the second point cloud from the second sensor on the robot via minimizing the cross-sensor energy, the first and second point cloud comprising an aggregate of sequential scans from the first and second sensor with first and second rotational transforms applied thereto respectively, the alignment yields a third transform comprising a translation and rotation; and apply the third transform to (i) data from the first sensor, and (ii) the sensor origin point of the first sensor for each scan.

* * * * *